United States Patent
Suda et al.

(10) Patent No.: US 12,436,187 B2
(45) Date of Patent: Oct. 7, 2025

(54) ELECTRONIC COMPONENT HANDLING APPARATUS, AND ELECTRONIC COMPONENT TEST APPARATUS

(71) Applicant: ADVANTEST Corporation, Tokyo (JP)

(72) Inventors: Akihisa Suda, Tokyo (JP); Yoshitaka Takeuchi, Tokyo (JP); Takuro Kajihara, Tokyo (JP)

(73) Assignee: ADVANTEST Corporation, Tokyo (JP)

( * ) Notice: Subject to any disclaimer, the term of this patent is extended or adjusted under 35 U.S.C. 154(b) by 273 days.

(21) Appl. No.: 18/194,138

(22) Filed: Mar. 31, 2023

(65) Prior Publication Data

US 2023/0341462 A1 Oct. 26, 2023

(30) Foreign Application Priority Data

Apr. 21, 2022 (JP) ................ 2022-070313

(51) Int. Cl.
| | |
|---|---|
| *G01R 31/28* | (2006.01) |
| *G01R 1/04* | (2006.01) |
| *G01R 1/067* | (2006.01) |
| *G01R 1/073* | (2006.01) |
| *G01R 31/26* | (2020.01) |

(52) U.S. Cl.
CPC ..... *G01R 31/2893* (2013.01); *G01R 31/2867* (2013.01)

(58) Field of Classification Search
CPC ............ G01R 31/26; G01R 31/2601; G01R 31/2644; G01R 31/28; G01R 31/286; G01R 31/2867; G01R 31/2874; G01R 31/2884; G01R 31/2893; G01R 1/04; G01R 1/0416; G01R 1/067; G01R 1/073

See application file for complete search history.

(56) References Cited

U.S. PATENT DOCUMENTS

| | | |
|---|---|---|
| 2013/0214809 A1 | 8/2013 | Nakamura et al. |
| 2015/0153388 A1 | 6/2015 | Nakamura et al. |
| 2015/0153389 A1 | 6/2015 | Nakamura et al. |
| 2019/0346482 A1* | 11/2019 | Kiyokawa ............ G01R 1/0433 |
| 2022/0011340 A1 | 1/2022 | Kiyokawa et al. |
| 2022/0011341 A1 | 1/2022 | Kiyokawa et al. |

(Continued)

FOREIGN PATENT DOCUMENTS

| | | |
|---|---|---|
| JP | 2013-79860 A | 5/2013 |
| JP | 2019-197012 A | 11/2019 |

(Continued)

OTHER PUBLICATIONS

Office Action issued in corresponding Korean Patent Application No. 10-2023-0041953, dated Dec. 17, 2024, with translation (16 pages).

*Primary Examiner* — Neel D Shah
(74) *Attorney, Agent, or Firm* — Osha Bergman Watanabe & Burton LLP

(57) ABSTRACT

An electronic component handling apparatus includes: a pressing device that presses a device under test (DUT) or a carrier containing the DUT against a socket while a test tray having an insert containing the DUT or the carrier is in a vertical state. The pressing device includes: a pusher that contacts the DUT or the carrier; and an abutting part that abuts the insert.

13 Claims, 18 Drawing Sheets

(56) References Cited

U.S. PATENT DOCUMENTS

2022/0011342 A1    1/2022   Kiyokawa et al.
2022/0011343 A1    1/2022   Kiyokawa et al.

FOREIGN PATENT DOCUMENTS

| JP | 2022-21239 A | 2/2022 | |
|---|---|---|---|
| JP | 2022-21241 A | 2/2022 | |
| KR | 10-2009-0061014 | 6/2009 | |
| KR | 10-2010-0071204 A | 6/2010 | |
| KR | 10-2013-0074874 | 7/2013 | |
| KR | 10-2014-0101461 A | 8/2014 | |
| KR | 20170006082 * | 1/2017 | ............... B07C 5/02 |
| KR | 10-2020-0047998 A | 5/2020 | |

* cited by examiner

Fig. 13C
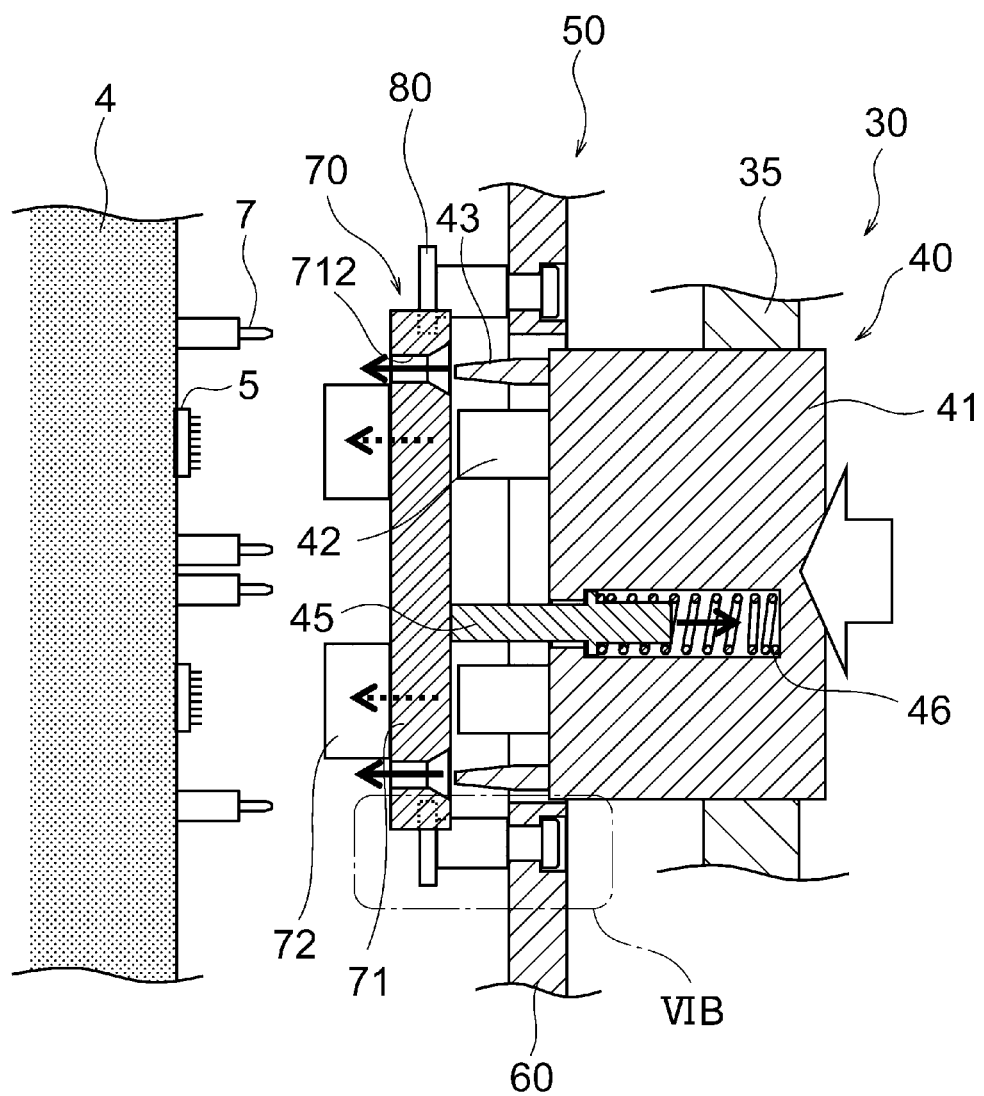
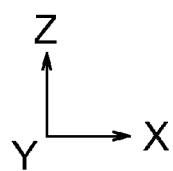

ELECTRONIC COMPONENT HANDLING APPARATUS, AND ELECTRONIC COMPONENT TEST APPARATUS

CROSS-REFERENCE TO RELATED APPLICATIONS

The present application claims priority to Japanese Patent Application No. 2022-070313 filed on Apr. 21, 2022. The contents of this application are incorporated herein by reference in their entirety.

BACKGROUND

Technical Field

The present invention relates to an electronic component handling apparatus and an electronic component test apparatus for testing a device under test (DUT: Device Under Test).

Description of Related Art

As an electronic component handling apparatus using a test tray containing a DUT, for example, an apparatus described in Patent Document 1 is known. In this electronic component handling apparatus, the DUT is pressed horizontally toward the socket by the pressing device while the test tray is in a vertical state.

PATENT DOCUMENT

PATENT DOCUMENT 1: JP 2022-021239 A1

In the test tray described above, an insert containing a DUT is movably held by a frame. Here, when the DUT is pressed against the socket, it is necessary to position the DUT with respect to the socket in a state where the DUT is in parallel with the socket. However, when the test tray is in a vertical state, the insert may be irregularly inclined with respect to the frame due to its own weight, and it may be difficult to accurately position the DUT with respect to the socket.

SUMMARY

One or more embodiments provide an electronic component handling apparatus and an electronic component test apparatus capable of accurately positioning a DUT with respect to a socket even when the DUT is tested while the test tray is in a vertical state.

[1] One or more embodiments is an electronic component handling apparatus comprising a pressing device that presses a DUT or a carrier containing (accommodating) the DUT against a socket while a test tray having an insert containing (accommodating) the DUT or the carrier is in a vertical state, wherein the pressing device comprises: a pusher that contacts the DUT or the carrier; and an abutting part that abuts the insert.

[2] According to one or more embodiments, the abutting part may abut the insert before the pusher contacts the DUT or the carrier.

[3] According to one or more embodiments, the abutting part may comprise: a push pin that contacts the insert; and a biasing member (a spring) that biases the push pin toward the insert.

[4] According to one or more embodiments, the insert may comprise an insert main body having an insertion opening into which the DUT or the carrier is inserted and made of a resin material.

[5] According to one or more embodiments, the push pin may contact an area of the insert main body including a center of gravity of the insert main body or an area of the insert main body lower than the center of gravity.

[6] According to one or more embodiments, the insert main body may have a plurality of insertion openings including the insertion opening, and the push pin may contact an area of the insert between the plurality of insertion openings.

[7] According to one or more embodiments, the insert may further comprise a device holding part attached to the insert main body to correspond to the insertion opening and holding the DUT or the carrier.

[8] According to one or more embodiments, the push pin may have an oval cross-sectional shape, and the push pin may be disposed so that a longitudinal direction of a cross section of the push pin is non-parallel to a vertical direction.

[9] According to one or more embodiments, the pressing device may comprise a base holding the push pin, and a protruding portion of the push pin protruding from the base may have a length so that the push pin contacts the insert before the pusher contacts the DUT or the carrier.

[10] According to one or more embodiments, the pressing device may comprise a first guide pin that can be fitted into a first guide hole of the insert, and the push pin and the first guide pin may be members independent of each other.

[11] According to one or more embodiments, the pressing device may comprise a base holding the push pin, and a protruding portion of the push pin protruding from the base may have a length so that the push pin contacts the insert before the first guide pin is fitted into the first guide hole.

[12] According to one or more embodiments, the pressing device may comprise a match plate comprising a plurality of pushers including the pusher, and the match plate may comprise a second guide pin that can be fitted into a second guide hole of the test tray.

[13] According to one or more embodiments, the test tray may comprise: the insert; a frame having the second guide hole having an oval planar shape; and a fastener fixed to the frame and movably holding the insert, and the second guide hole may be formed in the frame so that a longitudinal direction of a cross section of the second guide hole is substantially parallel to a vertical direction in a state in which the pusher faces the DUT or the carrier held on the test tray.

[14] According to one or more embodiments, the test tray may comprise: the insert; a frame; a fastener fixed to the frame and movably holding the insert; and a centering mechanism that centers the insert as the abutting part abuts the insert.

[15] According to one or more embodiments, the test tray may comprise: the insert; a frame; and a fastener fixed to the frame and movably holding the insert, the fastener may movably hold the insert by inserting the fastener into a cutout of the insert, the fastener may comprise: a shaft portion; and a flange portion larger than the shaft portion, the cutout of the insert may comprise: an insertion portion in which the shaft portion is inserted; and an enlarged portion that is larger than the insertion portion and contains (accommodates) the flange portion, the enlarged portion may have a bottom surface at which the insertion portion is open and that the flange portion can contact, and the enlarged portion may have a shape that tapers toward the bottom surface.

[16] An electronic component test apparatus according to one or more embodiments comprises: the electronic component handling apparatus according to one or more embodiments; and a tester having a socket.

According to one or more embodiments, because the pressing device comprises the abutting part that abuts the insert, it is possible to correct the posture of the insert that is inclined with respect to the frame to a vertical state, and it is possible to accurately position the DUT with respect to the socket.

BRIEF DESCRIPTION OF THE DRAWINGS

FIG. 13C is a cross-sectional view (part 3) showing the DUT pressing operation in one or more embodiments.

DESCRIPTION OF THE EMBODIMENTS

Hereinafter, embodiments will be described with reference to the drawings.

Figure 1:
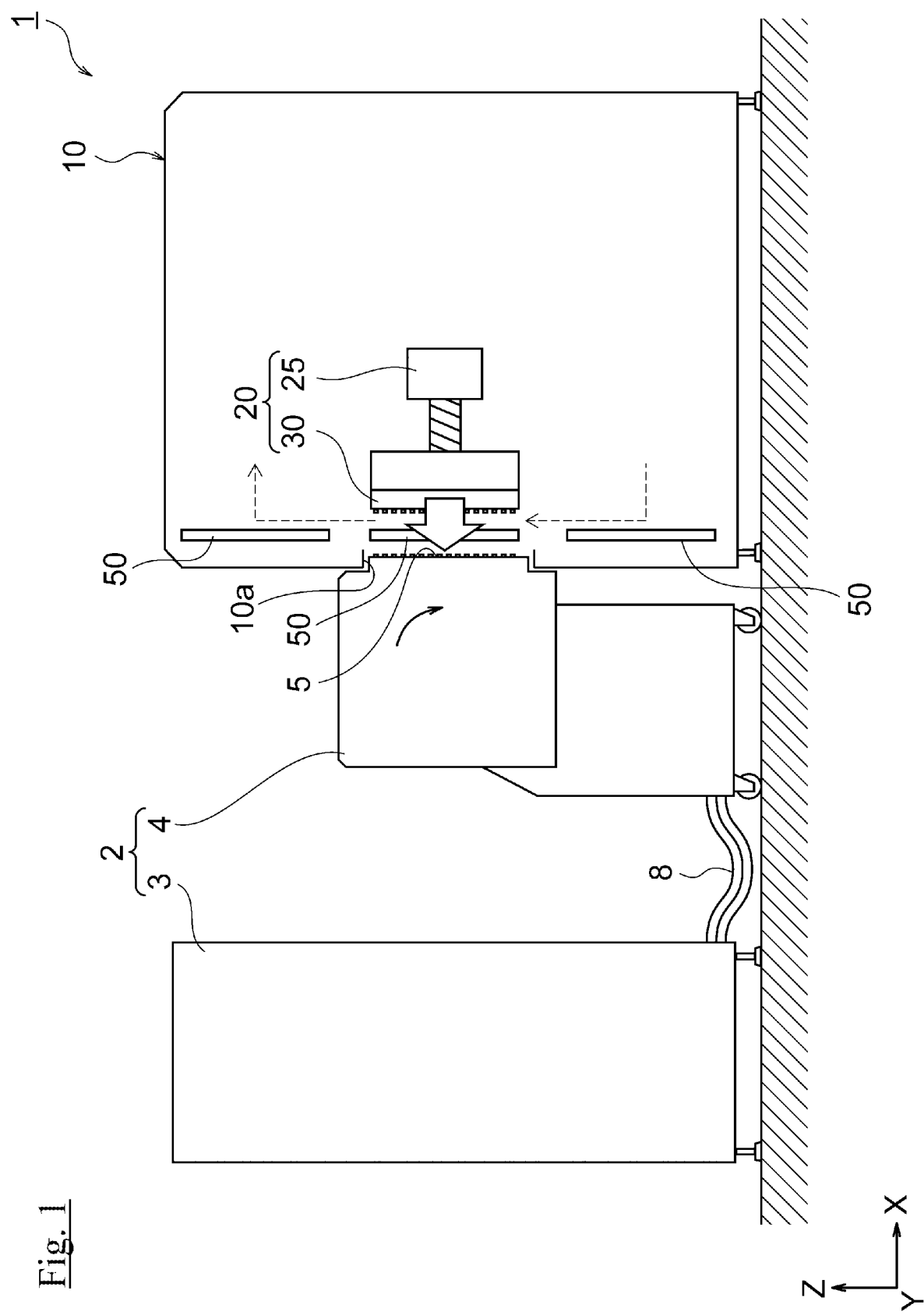
FIG. 1 is a schematic cross-sectional view showing the overall configuration of an electronic component test apparatus in one or more embodiments.

FIG. 1 is schematic cross-sectional view showing the overall configuration of an electronic component test apparatus 1 in one or more embodiments.

The electronic component test apparatus 1 of one or more embodiments is an apparatus for testing electrical characteristics of a DUT 100 (for example, an electronic component, such as a semiconductor integrated circuit device). As shown in FIG. 1, the electronic component test apparatus 1 includes a tester 2 that tests the DUT 100 and a handler 10 that conveys the DUT 100 and presses the DUT 100 against a socket 5. Although not particularly limited, examples of the electronic component test apparatus 1 and the handler 10 include those described in JP 2022-021239 A1 or JP 2022-021241 A1. A memory device, a logic device, or a SoC (System on a chip) can be exemplified as a specific example of the DUT 100 to be tested (refer to FIG. 4, FIG. 13D, and FIG. 13E).

As shown in FIG. 1, the tester 2 includes a main frame (tester main body) 3 and a test head 4. The main frame 3 is connected to the test head 4 via a cable 8. A plurality of (two hundred fifty-six (256) in this example) sockets 5 are mounted on the upper portion of the test head 4. The test head 4 is inserted into the opening 10a of the handler 10 in a state where the posture of the test head 4 is rotated by 90 degrees, and the plurality of sockets 5 are located inside the handler 10 in a state of being oriented horizontally.

In one or more embodiments, two hundred fifty-six (256) sockets 5 are arranged in sixteen (16) rows and sixteen (16) columns on the upper portion of the test head 4. The number of sockets 5 that the test head 4 has is not particularly limited to the above, and the arrangement of the sockets 5 is also not particularly limited to the above. Each of the sockets 5 has contacts 6 (refer to FIG. 13D) that contact terminals of the DUT 100. Although not particularly limited, examples of such contact 6 include a pogo pin, a cantilever type probe needle, an anisotropic conductive rubber sheet, and a membrane type contact in which bumps are formed on an insulating film.

The handler 10 includes a pressing device 20 that presses the DUT 100 against the socket 5 while the DUT 100 is contained in the test tray 50. At this time, in one or more embodiments, the handler 10 presses the DUT 100 against the socket 5 by the pressing device 20 while the test tray 50 is in a vertical state (vertical posture). In this state, the mainframe 3 transmits a test signal to the DUT 100 via the test head 4 to test the DUT 100. The "vertical state" in one or more embodiments means a state in which the main surface of the test tray 50 is substantially parallel to the vertical direction (the Z-axis direction in the drawing).

Although not shown in the drawings, the handler 10 may have a function (loader unit) for transferring the untested DUT 100 from a custom tray (not shown) to the test tray 50 before the DUT 100 is tested. The handler 10 may have a function (thermal stress applying unit) for applying a high-temperature or low-temperature thermal stress to the DUT 100 while the untested DUT 100 is contained in the test tray 50.

Although not shown in the drawings, the handler 10 may have a function (thermal stress removing unit) for removing thermal stress from the DUT 100 while the tested DUT 100 is contained in the test tray 50 after the DUT 100 is tested. The handler 10 may have a function (unloader unit) for transferring the DUT 100 from the test tray 50 to the custom tray while sorting the tested DUT 100 according to the test result.

Here, the custom tray is a tray for transporting a plurality of the DUTs 100 between a process using the electronic component test apparatus 1 and other process. The custom tray is, for example, a tray conforming to JEDEC (Joint Electron Device Engineering Council) standard and is a plate-shaped tray made of a resin material or the like. The customer tray has a plurality of pockets arranged in a matrix, and each of the pockets has a concave shape that can contain the DUT 100. The untested DUT 100 is carried into the handler 10 from the previous process while being mounted on the customer tray. The tested DUT 100 is carried out from the handler 10 to a subsequent process while being mounted on the customer tray.

On the other hand, the test tray 50 is a tray that is conveyed and circulated in the handler 10 while containing the plurality of DUTs 100. The test tray 50 will be described below with reference to FIG. 2 to FIG. 9.

Figure 2:
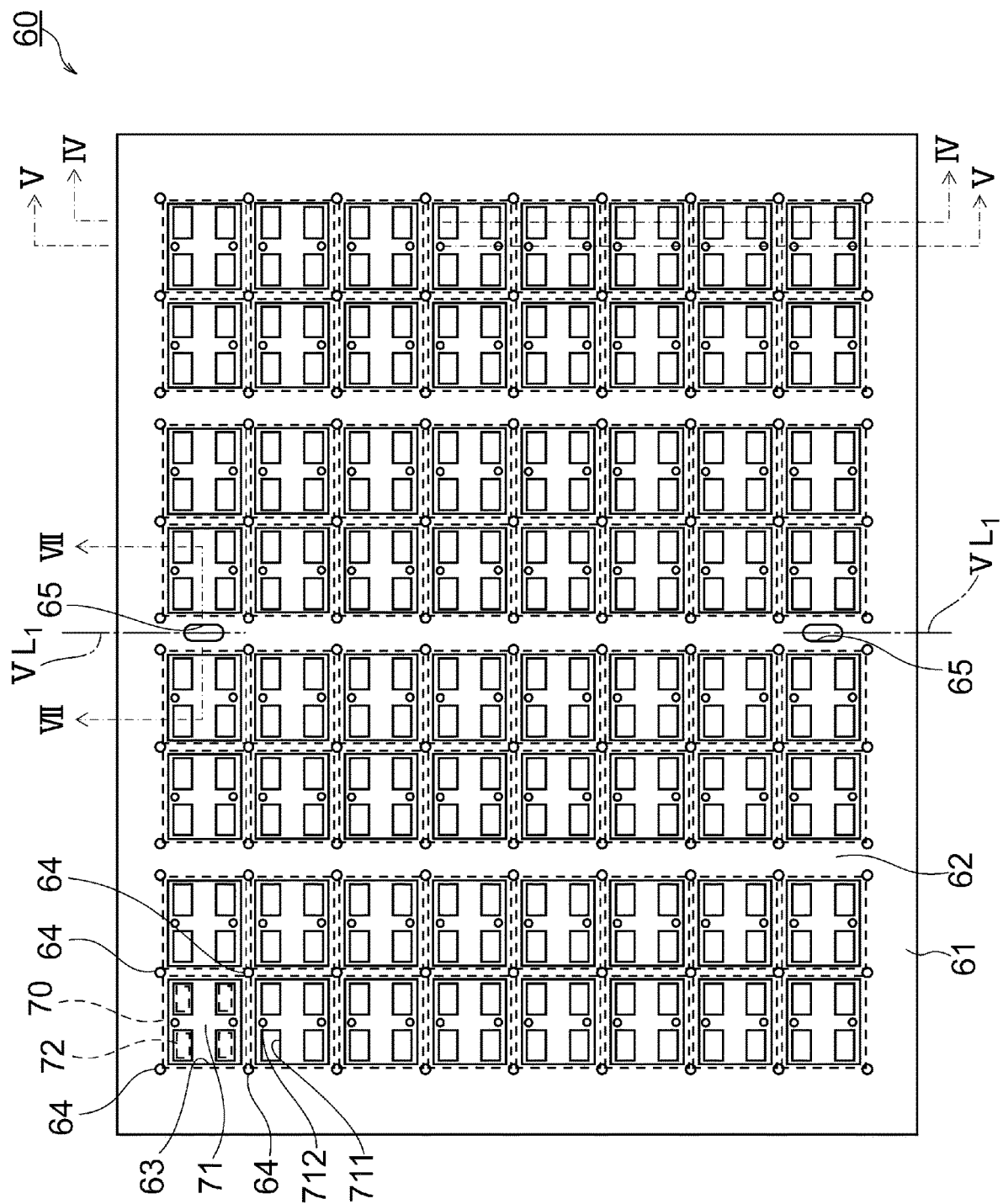
FIG. 2 is a front view showing a test tray used in the electronic component test apparatus in one or more embodiments.
Figure 3:
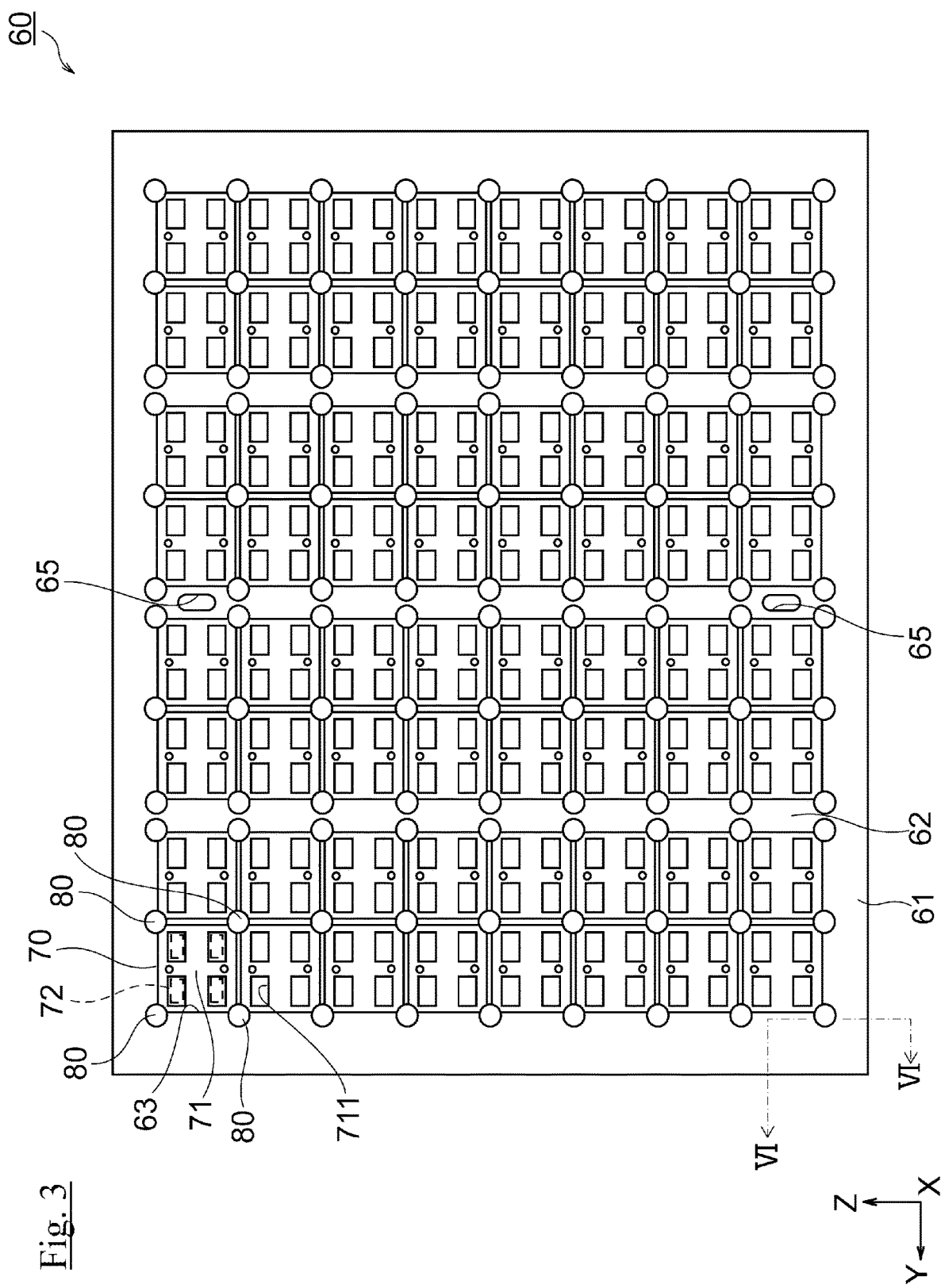
FIG. 3 is a rear view of the test tray shown in FIG. 2.
Figure 4:
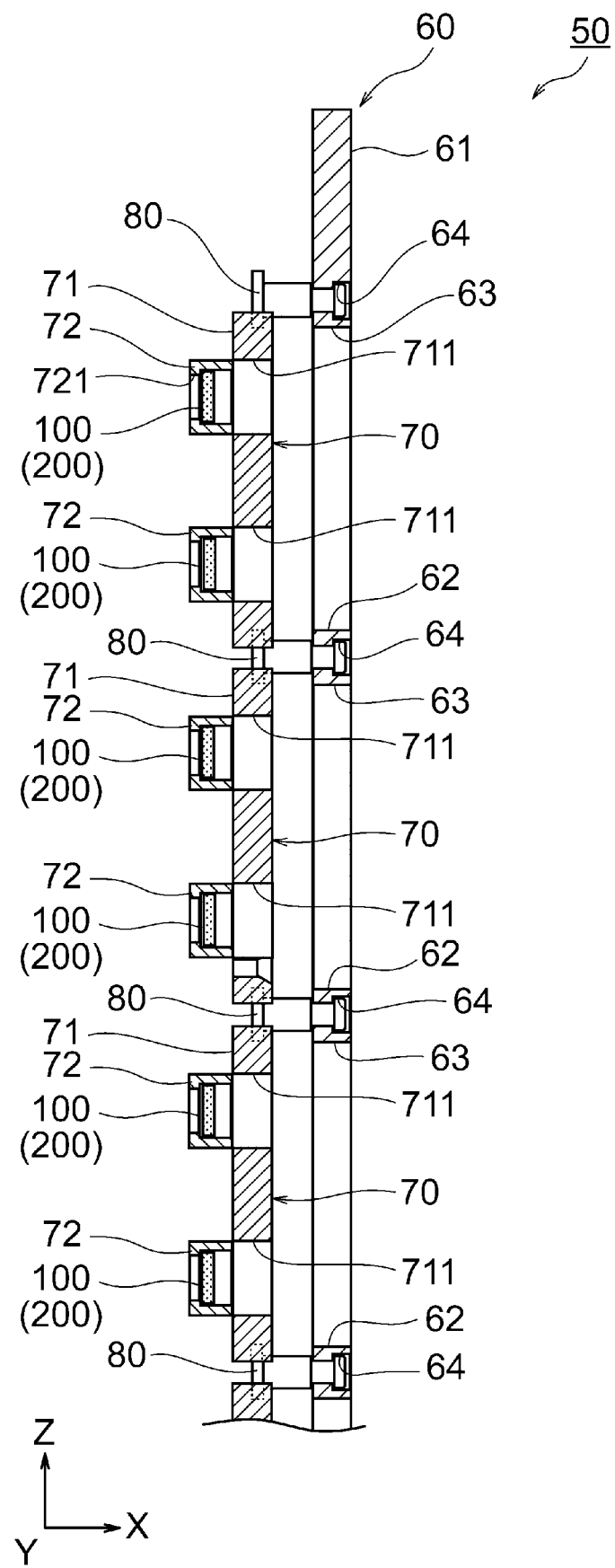
FIG. 4 is a cross-sectional view taken along IV-IV line of FIG. 2.
Figure 5:
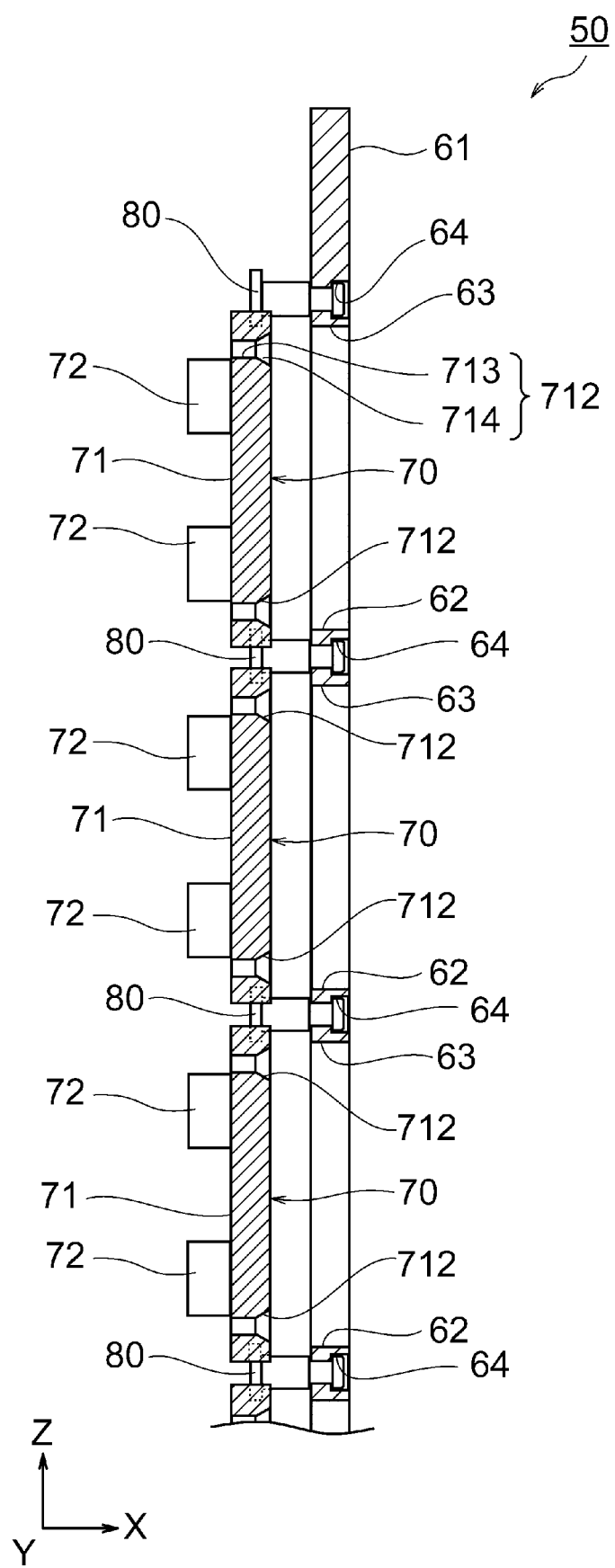
FIG. 5 is a cross-sectional view taken along V-V line of FIG. 2.
Figure 6A:
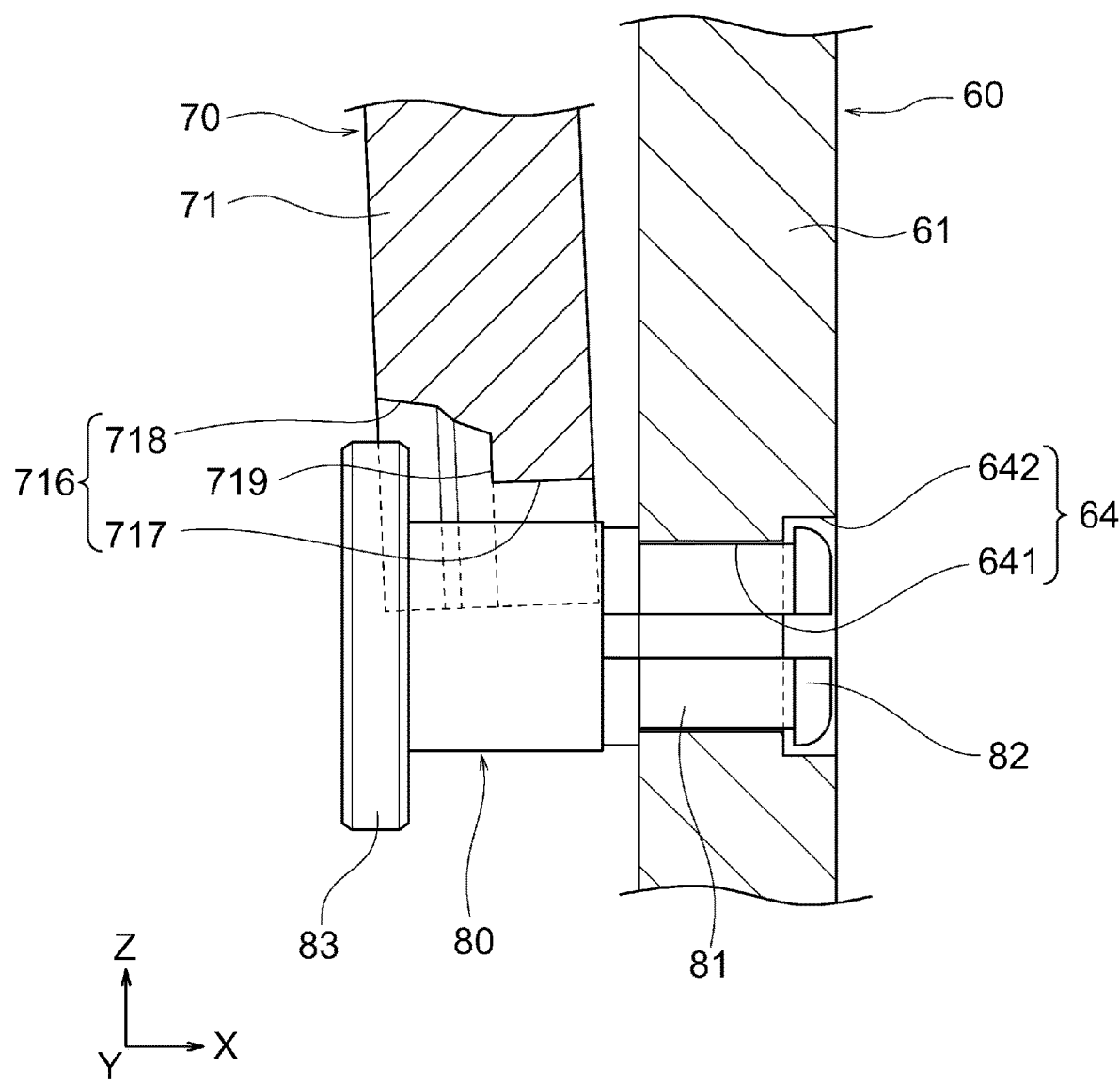
FIG. 6A is a cross-sectional view taken along VI-VI line of FIG. 3 and a diagram showing a state before the insert is centered.
Figure 6B:
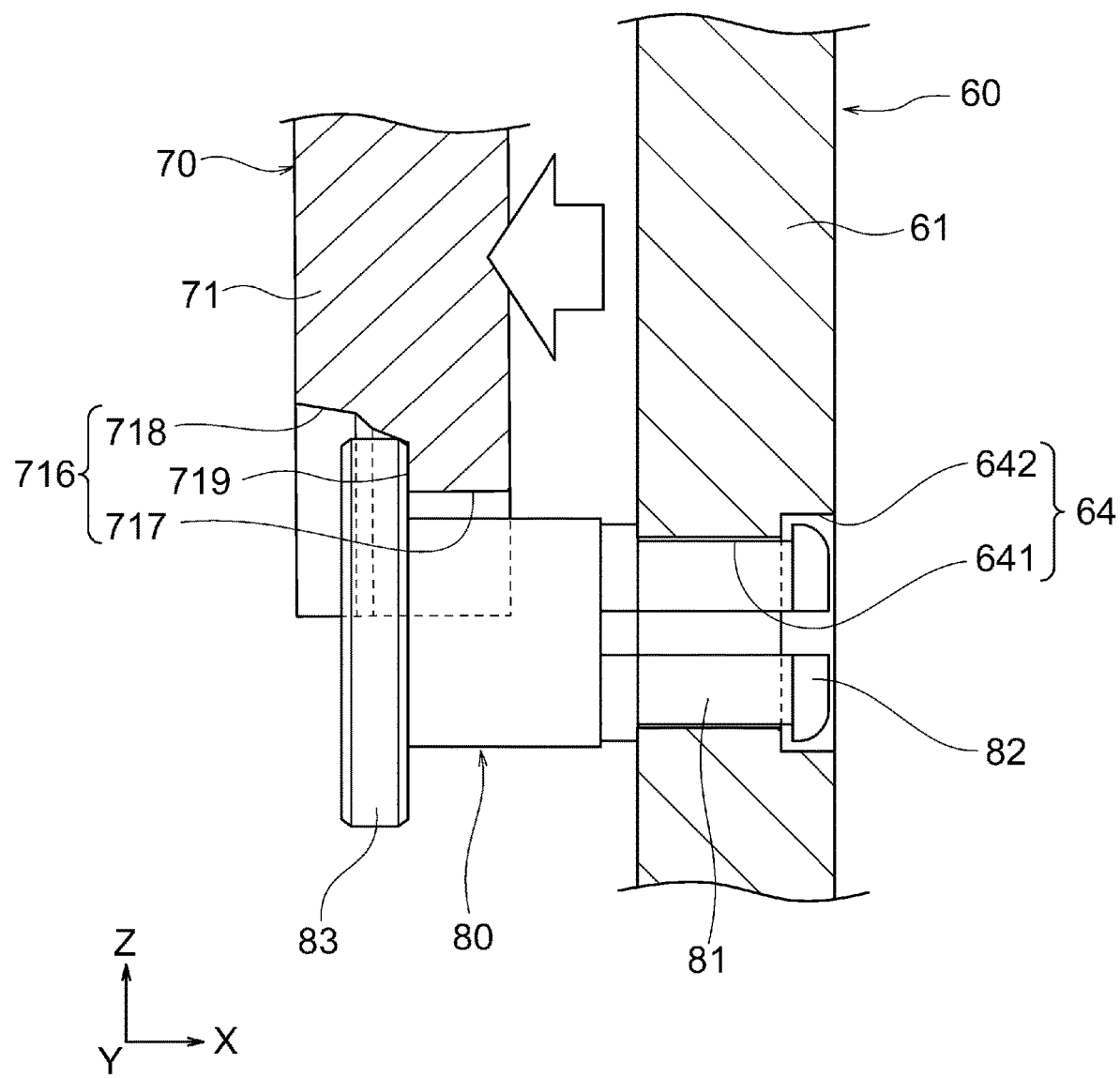
FIG. 6B is a cross-sectional view taken along VI-VI line of FIG. 3 and a diagram showing a state after the insert is centered.
Figure 7:
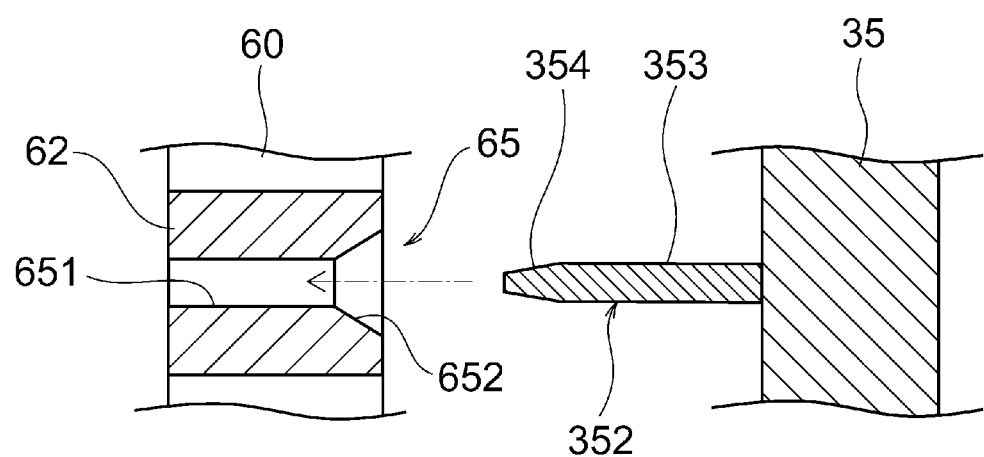
FIG. 7 is a cross-sectional view taken along VII-VII line of FIG. 2.
Figure 8:
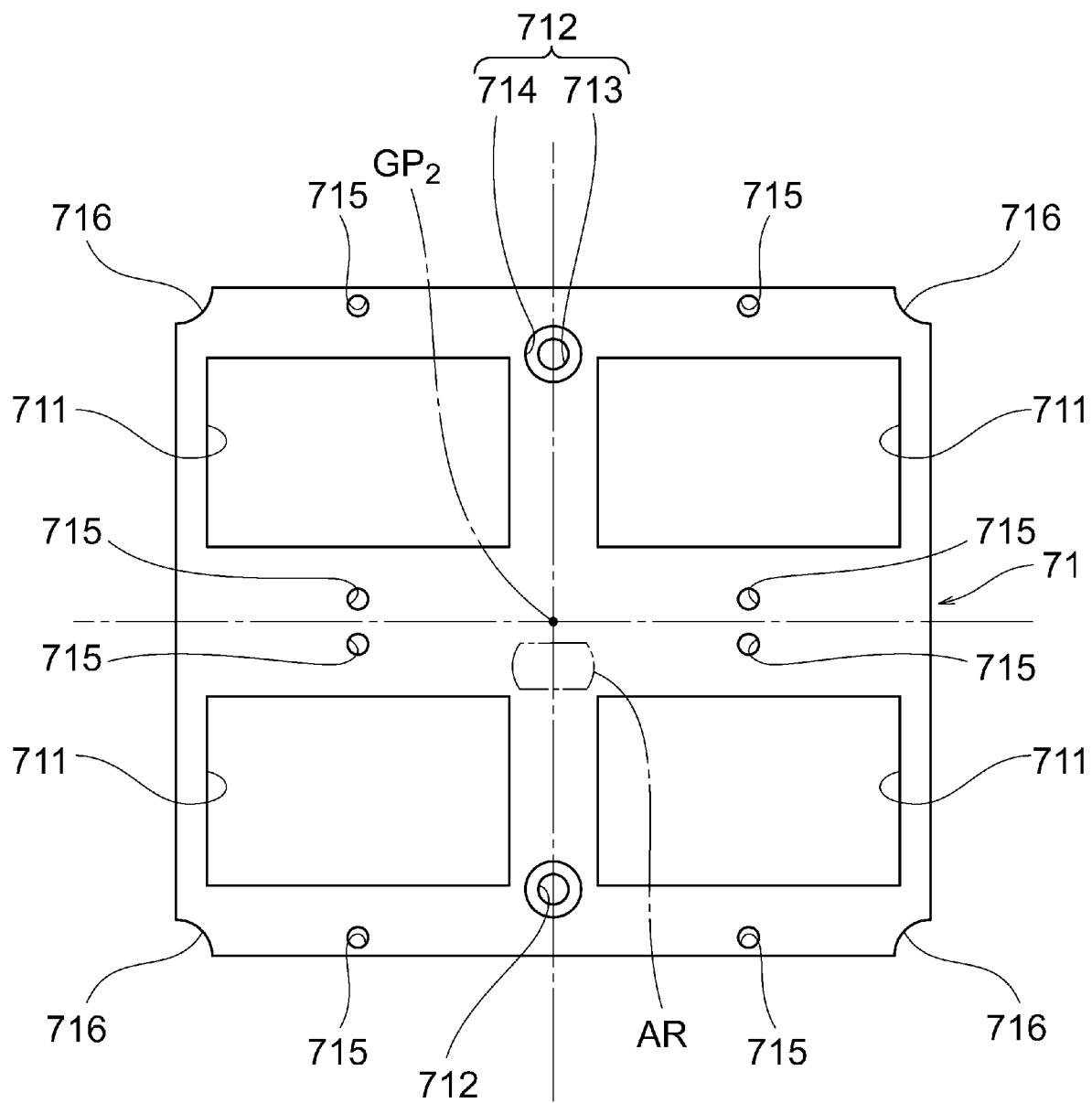
FIG. 8 is a front view showing an insert main body of the test tray in one or more embodiments.
Figure 9:
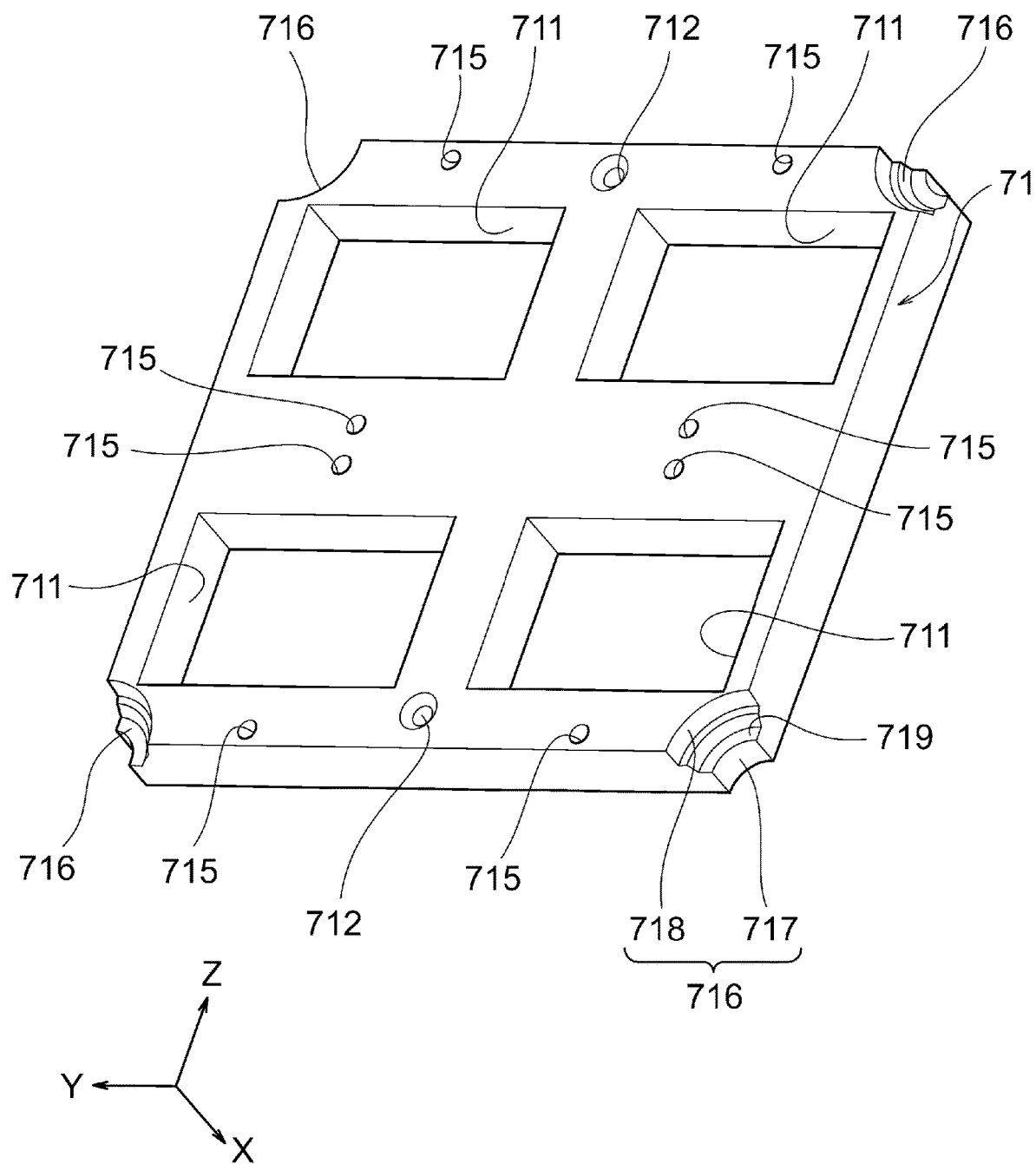
FIG. 9 is a rear perspective view of the insert main body shown in FIG. 8 as seen from the rear side.

FIG. 2 is a front view showing the test tray 50 used in the electronic component test apparatus 1 in one or more embodiments, FIG. 3 is a rear view of the test tray 50 shown in FIG. 2, FIG. 4 is a cross-sectional view taken along IV-IV line of FIG. 2, and FIG. 5 is a cross-sectional view taken along V-V line of FIG. 2. FIG. 6A and FIG. 6B are cross-sectional views taken along VI-VI line of FIG. 3, FIG. 6A is a diagram showing a state before the insert 70 is centered, and FIG. 6B is a diagram showing a state after the insert 70 is centered. FIG. 7 is a cross-sectional view taken along VII-VII line of FIG. 2, FIG. 8 is a front view showing an insert main body 71 of the test tray 50 in one or more embodiments, and FIG. 9 is a rear perspective view of the insert main body 71 shown in FIG. 8 as seen from the rear side.

As shown in FIG. 2 to FIG. 5, the test tray 50 includes a frame member 60, a plurality of (sixty-four (64) in this example) inserts 70, and a plurality of fasteners 80.

The frame member 60 includes a rectangular outer frame 61 and a grid-like inner frame 62 disposed inside the outer frame 61. The frame member 60 has rectangular openings 63 defined by an outer frame 61 and an inner frame 62. In one or more embodiments, sixty-four (64) openings 63 are arranged in eight (8) rows and eight (8) columns in the frame member 60. The plurality of inserts 70 are arranged to correspond to the openings 63 of the frame member 60 respectively, and the outer peripheral portion of the inserts 70 overlaps the outer frame 61 or the inner frame 62 of the frame member 60. The number and arrangement of the openings 63 in the frame member 60 are not particularly limited to the above and may be set according to the number and arrangement of the inserts 70 in the test tray 50.

Each insert 70 is held by fasteners 80 at four corners of the insert 70, and the fastener 80 is fixed to the frame member 60 at its tip. For this reason, the frame member 60 has a plurality of fixing holes 64 for fixing the fasteners 80.

As shown in FIG. 6A and FIG. 6B, each of the fixing holes 64 includes an insertion portion 641 and a counterbore portion 642 having an inner diameter larger than an inner diameter of the insertion portion 641. A front end portion of a shaft portion 81 (described later) of the fastener 80 is inserted into the insertion portion 641 of the fixing hole 64, and a head portion 82 (described later) of the fastener 80 is inserted into the counterbore portion 642.

As shown in FIG. 2 and FIG. 3, each of the fixing holes 64 is arranged to correspond to a corner of the opening 63, and the corners of the plurality of inserts 70 adjacent to each other are held together by one fastener 80. Specifically, concerning the fastener 80 fixed to the inner frame 62, the corners of the four (4) or two (2) inserts 70 are held together by one fastener 80. Concerning the fastener 80 fixed to the outer frame 61, the corners of the two (2) inserts 70 are held together by one fastener 80. That is, one fastener 80 is shared by a plurality of inserts 70 adjacent to each other. Concerning some of the fasteners 80 fixed to the outer frame 61, only one (1) fastener 80 holds one insert 70.

As shown in FIG. 2, guide holes 65 are formed in the inner frame 62 of the frame member 60. The guide holes 65 are arranged at a center of the frame member 60 in the longitudinal direction (the Y-axis direction in the drawing) of the frame member 60. As shown in FIG. 7, each of the guide holes 65 includes a hole main body portion 651 and a tapered portion 652. The hole main body portion 651 is open at one end thereof (the insert 70 side; the −X direction side in the drawing) and is connected to the tapered portion 652 at the other end thereof. The tapered portion 652 has a tapered inner diameter that expands from the hole main body portion 651 toward the side opposite to the insert 70 (the +X direction side in the drawing).

Each of the guide holes 65 has an oval cross-sectional shape. Here, the oval means a shape including a pair of straight portions extending in parallel to each other and a pair of arc portions connecting the straight portions to each other. As shown in FIG. 2, the guide hole 65 is formed in the inner frame 62 of the frame member 60 so that the longitudinal $VL_1$ of the guide hole 65 is substantially parallel to the vertical direction (the Z-axis direction in the drawing) in a state in which the pressing device 20 presses the DUT 100 against the socket 5 (i.e., a state in which the test tray 50 is in a vertical state). A guide pin 352 (described later) included in the pressing device 20 is fitted into the guide hole 65.

As shown in FIG. 2 to FIG. 5, each of the inserts 70 includes an insert main body 71 and a plurality (four (4) in this example) of device cores 72. In FIG. 2 and FIG. 3, in order to facilitate understanding of the configuration of the test tray 50, only some of the device cores 72 are indicated by broken lines. The device core 72 corresponds to an example of a "device holding part" in one or more aspects.

As shown in FIG. 8 and FIG. 9, the insert main body 71 is a resin molded body having a rectangular plate shape. In one or more embodiments, four (4) insertion openings 711 are formed in the insert main body 71, and the four (4) insertion openings 711 are arranged in two (2) rows and two (2) columns. Each of the insertion openings 711 faces the opening 63 of the frame member 60 in a state where the insert 70 is attached to the frame member 60.

As shown in FIG. 4, a plurality of device cores 72 are arranged to correspond to the insertion openings 711 respectively. Therefore, the entire test tray 50 includes two hundred fifty-six (256) device cores 72 arranged in sixteen (16) rows and sixteen (16) columns, and the arrangement of the device cores 72 corresponds to the arrangement of the sockets 5 on the test head 4 described above.

The number and arrangement of device cores 72 included in each insert 70 are not particularly limited to the above. Also, the number and arrangement of the device cores 72 on the test tray 50 are not particularly limited to the above and are set according to the number and arrangement of the sockets 5 on the test head 4.

Each of the device cores 72 is detachably fixed to the insert main body 71 by hooks (not shown). Each of the device cores 72 is a resin molded body having an opening 721 formed at the bottom of the device core 72 and can hold the DUT 100 while the terminals of the DUT 100 are exposed through the opening 721. Thus, since each of the device cores 72 can hold one DUT 100, it is possible to hold four (4) DUTs 100 per one (1) insert 70, and it is possible to hold two hundred fifty-six (256) DUTs 100 by the entire of test tray 50.

The device core 72 is removed from the insert main body 71 and is replaced with other device core 72 suitable for the DUT 100 after the change of the type of the DUT 100 when the type of the DUT 100 is changed. The number of device cores 72 included in the insert 70 may be one (1). In this case, the device core 72 may be integrally formed with the insert main body 71, and the device core 72 may not be detachable from the insert main body 71.

As shown in FIG. 5, FIG. 8 and FIG. 9, two guide holes 712 are formed in the insert main body 71. The guide holes 712 are respectively disposed on the upper and lower portions of the insert main body 71 on the center line of the insert main body 71.

As shown in FIG. 5 and FIG. 8, each of the guide holes 712 includes a hole main body portion 713 and a tapered portion 714. The hole main body portion 713 is open at one end thereof (the side opposite to the frame member 60; the −X direction side in the drawing) and is connected to the tapered portion 714 at the other end thereof. The tapered portion 714 has a tapered inner diameter that expands from the hole main body portion 713 toward the opening 73 of the frame member 60. A guide pin 43 (described later) included in the pressing device 20 is fitted into the guide hole 712.

As shown in FIG. 8 and FIG. 9, four (4) pairs of through holes 715 are formed in the insert main body 71. The four (4) pairs of through holes 715 are arranged to sandwich the four (4) insertion openings 711 respectively, the two (2) through holes 715 forming each pair are arranged on the upper and lower sides of the insertion opening 711. Each of the through holes 715 is arranged at a position corresponding to, for example, the guide pin 7 (refer to FIG. 13A to FIG. 13E) of the socket guide (not shown) and has an outer diameter sufficiently larger than the outer diameter of the guide pin 7.

Here, the device core 72 also has a guide hole (not shown) at a position corresponding to the through hole 715, and the guide pin 7 of the socket guide is fitted into the guide hole of the device core 72. At this time, the through hole 715 of the insert main body 71 prevents interference between the insert main body 71 and a portion of the guide pin 7 protruding from the guide hole of the device core 72 toward the insert main body 71. The socket guide is a member provided on the test head 4 to surround the socket 5.

As shown in FIG. 9, cutouts 716 are formed at all four corners of the insert main body 71 respectively. As shown in FIG. 6A, FIG. 6B and FIG. 9, each of the cutouts 716 includes an insertion portion 717 and an enlarged portion 718.

The insertion portion 717 has a shape (substantially quarter cylinder shape) like one obtained by dividing the cylinder into ¼. The insertion portion 717 is open at one end thereof (the frame member 60 side; the +X direction side in the drawing) and is connected to the enlarged portion 718 at the other end thereof. The insertion portion 717 has a radius larger than the radius of the insertion portion 641 of the fixing hole 64 of the frame member 60 described above so that the fastener 80 can freely hold the insert 70.

The enlarged portion 718 has a shape (substantially quarter cup shape) like one obtained by dividing the cup into ¼. The enlarged portion 717 is open at one end opposite to the end to which the insertion portion 717 is connected (the side opposite to the frame member 60; the −X direction side in the drawing). The enlarged portion 718 has a radius larger than the radius of the insertion portion 717 and larger than the radius of the flange portion 83 of the fastener 80. The enlarged portion 718 has a stepped shape that tapers stepwise toward the insertion portion 717, and the bottom surface 719 (the surface where the insertion portion 717 is open) of the enlarged portion 718 has a radius slightly larger than the radius of the flange portion 83. The enlarged portion 718 may have a shape (for example, a curved surface shape) that continuously tapers toward the insertion portion 717.

As shown in FIG. 6A and FIG. 6B, the fastener 80 includes a shaft portion 81, a head portion 82, and a flange portion 83. The shaft portion 81 has a cylindrical shape having a radius smaller than the radius of the insertion portion 717 of the cutout 716 of the insert main body 71. The head portion 82 is connected to the front end of the shaft portion 81. The head portion 82 has an outer diameter larger than the outer diameter of the front end of the shaft portion 81 and larger than the inner diameter of the insertion portion 641 of the fixing hole 64 of the frame member 60. The flange portion 83 is connected to the rear end of the shaft portion 81. The flange portion 83 is connected to the rear end of the shaft portion 81. The flange portion 83 has a disk shape having a radius larger than the radius of the rear end of the shaft portion 81 and larger than the radius of the insertion portion 717 of the cutout 716 of the insert main body 71.

The fastener 80 is fixed to the frame member 60 and movably holds the insert 70. Since the inserts 70 are movably held by the fasteners 80 in this way, the plurality of inserts 70 can be positioned independently of each other with respect to the sockets 5.

Specifically, the front end portion of the shaft portion 81 of the fastener 80 is inserted into the insertion portion 641 of the fixing hole 64 of the frame member 60, and the head portion 82 of the fastener 80 is inserted into the counterbore portion 642 of the fixing hole 64. Thus, the head portion 82 is engaged with the step between the counterbore portion 642 and the insertion portion 641 in the fixing hole 64, and therefore the fastener 80 is fixed to the frame member 60.

The rear end portion of the shaft portion 81 of the fastener 80 is contained in the insertion portion 717 of the cutout 716 of the insert main body 71, and the flange portion 83 of the fastener 80 is contained in the enlarged portion 718 of the cutout 716. Here, as described above, the insertion portion 717 has a radius larger than the radius of the shaft portion 81, and the enlarged portion 718 also has a radius larger than the radius of the flange portion 83. Therefore, as shown in FIG. 6A, the insert 70 is movably held by the fastener 80 in a normal state (a state in which no load other than gravity is applied to the insert 70).

Further, as described above, the bottom surface 719 of the enlarged portion 718 of the cutout 716 has a radius slightly larger than the radius of the flange portion 83. Therefore, as shown in FIG. 6B, when the insert 70 is pressed by the abutting part 44 (described later) of the pressing device 20, the flange portion 83 of the fastener 80 is guided along the enlarged portion 718 of the cutout 716 and contacts the bottom surface 719 of enlarged portion 718, and the insert 70 is centered with respect to opening 63 of frame member 60.

Next, the pressing device 20 of the electronic component handling apparatus 10 in one or more embodiments will be described with reference to FIG. 1 and FIG. 10 to FIG. 12.

Figure 10:
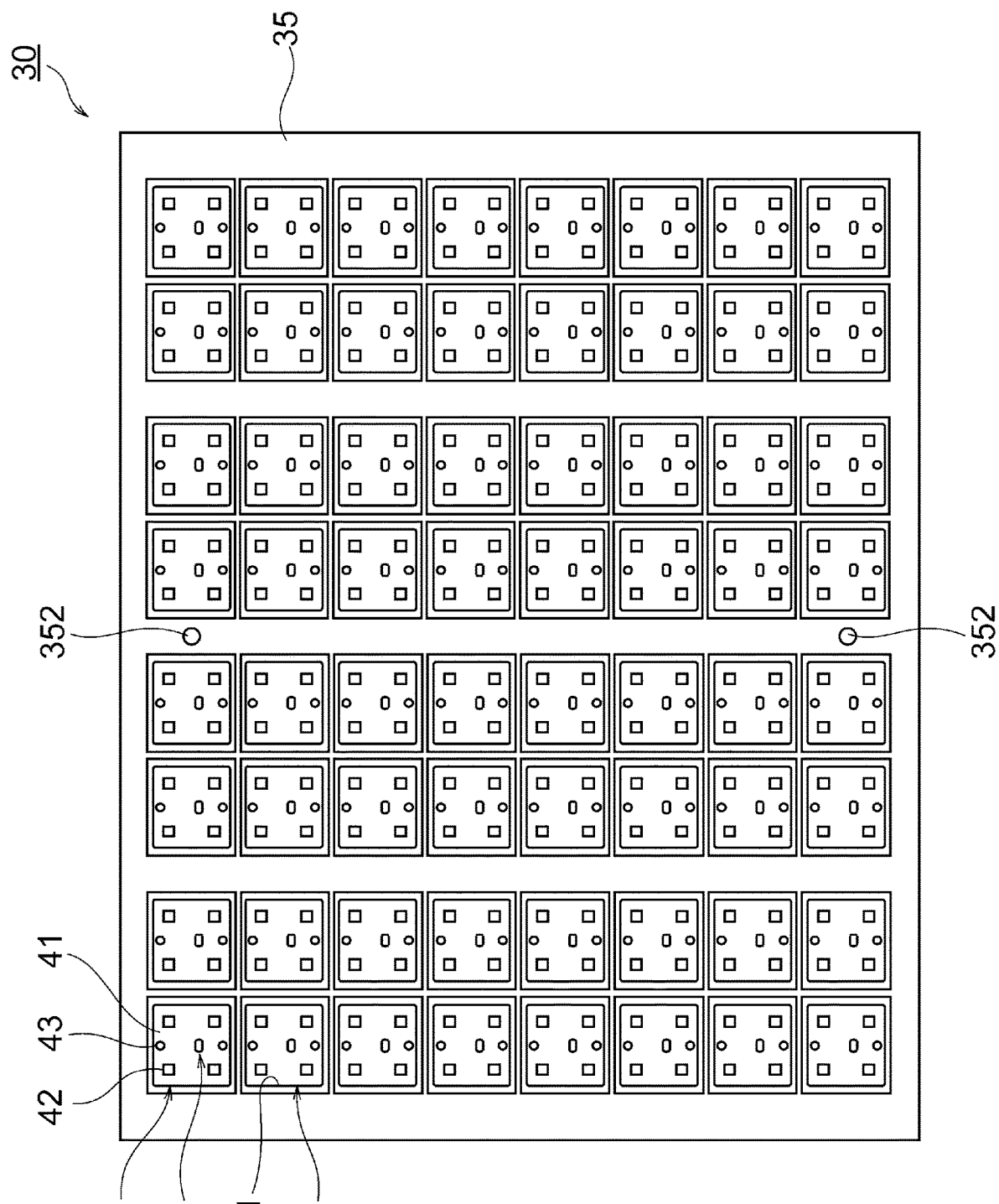
FIG. 10 is a rear view showing a match plate in one or more embodiments.
Figure 11:
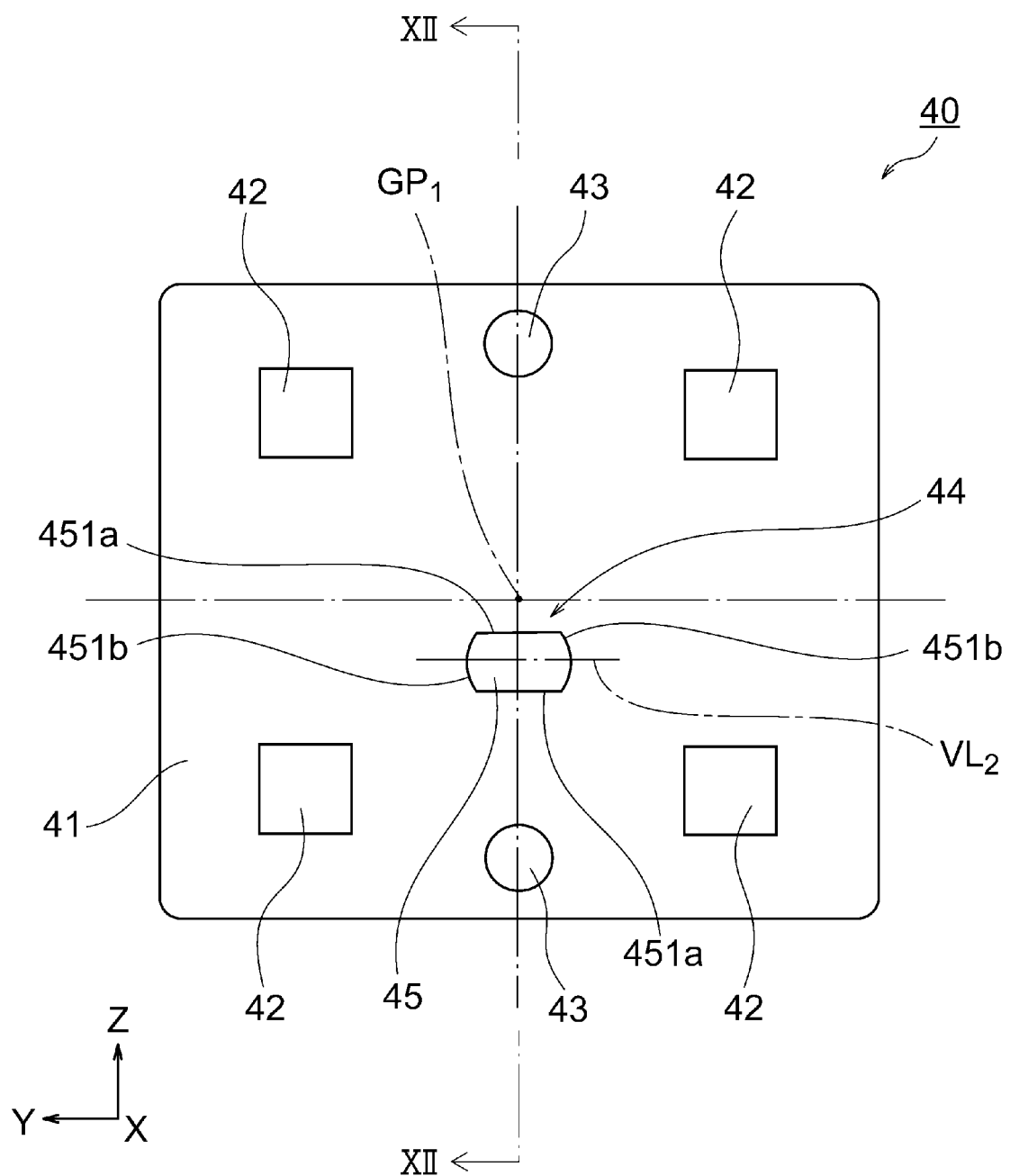
FIG. 11 is a rear view showing the pressing unit in one or more embodiments.
Figure 12:
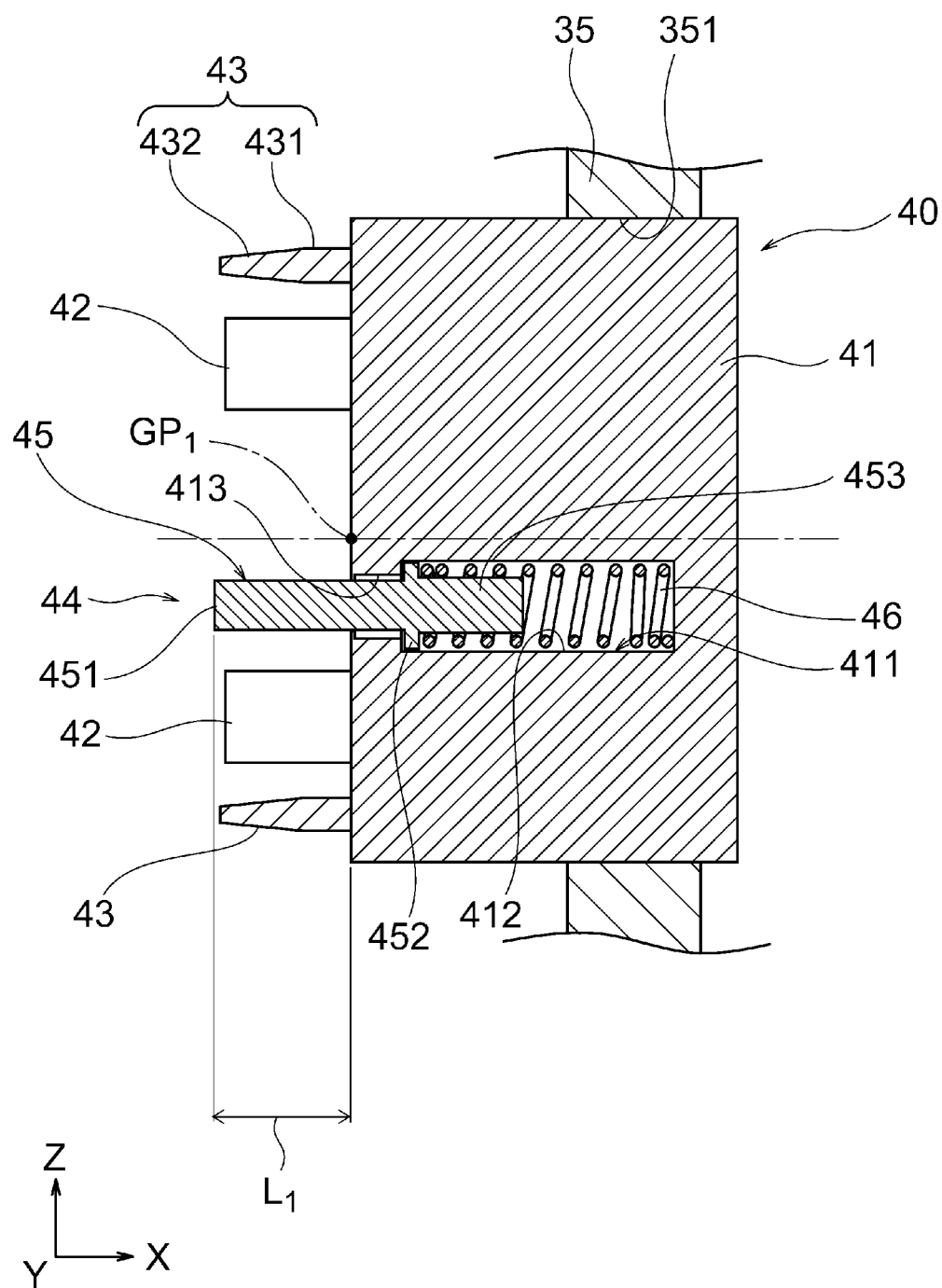
FIG. 12 is a cross-sectional view taken along XII-XII line of FIG. 11.

FIG. 10 is a rear view showing a match plate 30 in one or more embodiments, FIG. 11 is a rear view showing the pressing unit 40 in one or more embodiments, and FIG. 12 is a cross-sectional view taken along XII-XII line of FIG. 11.

As described above, a part of the test head 4 is inserted into the handler 10 through the opening 10a with the socket 5 oriented horizontally. As shown in FIG. 1, the pressing device 20 of the handler 10 is arranged to face the socket 5.

Although not particularly shown, the handler 10 includes a transport device that transports the test tray 50 containing the DUT 100 between the socket 5 on the test head 4 and the pressing device 20. The transport device includes tray transport rails that hold both ends of the test tray 50 in the longitudinal direction (the Y-axis direction in the drawing) and transport the test tray 50. The tray transport rail can move toward the test head 4 side together with the test tray 50 in accordance with the pressing operation of the DUT 100 by the pressing device 20.

When the test tray 50 containing the untested DUT 100 is carried into between the socket 5 and the pressing device 20 by the transport device, the pressing device 20 presses the DUT 100 against the socket 5 while the DUT 100 is contained in the test tray 50. When the test of the DUT 100 is completed, the test tray 50 containing the tested DUT 100 is carried out from between the socket 5 and the pressing device 20 by the transport device.

The pressing device 20 includes an actuator 25 and a match plate 30. The actuator 25 is a driving device that moves the match plate 30 along the X-axis direction in the drawing and can move the match plate 30 forward and backward toward the socket 5 on the test head 4. Although not particularly limited, an example of such an actuator 25 may be a motor having a ball screw mechanism.

As shown in FIG. 10, the match plate 30 includes a plate member 35 and a plurality of (sixty-four (64) in this example) pressing units 40. Sixty-four (64) holding holes 351 are formed in the plate member 35, and the holding holes 351 are arranged in eight (8) rows and eight (8) columns to correspond to the openings 63 of the frame member 60 of the test tray 50. The pressing unit 40 is attached to each opening 63. The number and arrangement of the holding holes 351 of the plate member 35 are not particularly limited to the above and are set according to the number and arrangement of the pressing units 40 of the pressing device 20.

Guide pins 352 are provided on the plate member 35. The guide pins 352 are arranged to correspond to the guide holes 65 of the frame member 60 of the test tray 50 and are arranged at the center of the match plate 30 in the longitudinal direction (the Y-axis direction in the drawing) of the match plate 30.

As shown FIG. 7 described above, the guide pin 352 includes a cylindrical pin body portion 353 and a tapered portion 354. The pin main body portion 353 has an outer diameter slightly smaller than the width of the hole main body portion 651 of the oval guide hole 65 in the lateral direction (the Y-axis direction in the drawing) of the hole main body portion 651 and can be fitted to the hole main body portion 651. On the other hand, the tapered portion 354 has a tapered shape from the pin body portion 353 toward the tip. When the guide pin 352 is fitted into the guide hole 65, the test tray 50 is positioned with respect to the match plate 30 in the horizontal direction (the Y-axis direction in the drawing).

The guide pin 352 corresponds to an example of the "second guide pin" in one or more aspects, and the guide hole 65 corresponds to an example of the "second guide hole" in one or more aspects.

As shown in FIG. 11 and FIG. 12, each of the pressing units 40 includes a base 41, a plurality of (four (4) in this example) pushers 42, guide pins 43, and an abutting part 44.

The base 41 is inserted into the holding hole 351 of the plate member 35 and is detachably fixed to the plate member 35. The pusher 42, the guide pin 43 and the abutting part 44 are provided on the base 41. The plurality of pressing units 40 of the match plate 30 respectively correspond to the plurality of inserts 70 of the test tray 50 described above.

Further, the base 41 is formed with a containing hole 411 in which a coil spring 46 (described later) of the abutting part 44 is contained. The containing hole 411 includes a containing portion 412 having an inner diameter larger than the outer diameter of the coil spring 46 and a small diameter portion 413 having an inner diameter smaller than the inner diameter of the containing portion 412.

The pushers 42 are arranged in two (2) rows and two (2) columns on the base 41. The arrangement of the pushers 42 corresponds to the arrangement of the four (4) insertion openings 711 described above formed in the insert main body 71 of the test tray 50. The pusher 42 enters the opening 63 of the frame member 60 of the test tray 50 and the insertion opening 711 of the insert main body 71, contacts the DUT 100 held by the device core 72, and presses the DUT 100 against the socket 5. The entire match plate 30 comprises two hundred fifty-six (256) pushers 42 arranged in sixteen (16) rows and sixteen (16) columns, and the arrangement of the pushers 42 corresponds to the arrangement of the sockets 5 on the test head 4 described above.

The number and arrangement of pushers 42 included in each of the pressing unit 40 are not particularly limited to the above. Also, the number and arrangement of the pushers 42 included in the match plate 30 are not particularly limited to the above and are set according to the number and arrangement of the sockets 5 on the test head 4.

The guide pins 43 are arranged to correspond to the above-described guide holes 712 of the insert main body 71 of the test tray 50. The guide pin 43 includes a cylindrical pin main body portion 431 and a tapered portion 432. The pin main body portion 431 has an outer diameter slightly smaller than the inner diameter of the hole main body portion 713 of the guide hole 712 and can be fitted to the hole main body portion 713. On the other hand, the taper portion 432 has a tapered shape from the pin main body portion 431 toward the tip. The insert 70 is positioned with respect to the pressing unit 40 by fitting the guide pin 43 into the guide hole 712.

The guide pin 43 corresponds to an example of the "first guide pin" in one or more aspects, and the guide hole 712 corresponds to an example of the "first guide hole" in one or more aspects.

The abutting part 44 is a mechanism that abuts the insert main body 71 in accordance with the forward movement of the pressing unit 40 by the driving of the actuator 25. The configuration of the abutting part 44 is not limited to the configuration described below as long as it contacts the insert main body 71 in accordance with the forward movement of the pressing unit 40.

In one or more embodiments, the abutting part 44 abuts against the insert 70, therefore it is possible to correct the posture of the insert 70 that is inclined with respect to the frame member 60 to a vertical state. Also, it is possible to center the insert 70 with respect to the opening 63 of the frame member 60 by the abutment of the abutting part 44 against the insert 70 and the guidance of the fastener 80 by the above-described cutout 716.

The abutting part 44 includes a push pin 45 that contacts the insert main body 71 and a coil spring 46 that biases the push pin 45.

The push pin 45 includes a first pin portion 451, a flange portion 452 and a second pin portion 453. The first pin portion 451 is connected to one surface of the flange portion 452, while the second pin portion 453 is connected to the other surface of the flange portion 452.

The first pin portion 451 of the push pin 45 has an outer diameter smaller than the inner diameter of the small diameter portion 413 of the containing hole 411 of the base 41. The first pin portion 451 passes through the small diameter portion 413 and protrudes to the outside of the containing hole 411. The flange portion 452 has an outer diameter larger than the inner diameter of the small diameter portion 413 of the containing hole 411 of the base 41 and smaller than the inner diameter of the containing portion 412. The second pin portion 453 also has an outer diameter smaller than the inner diameter of the containing portion 412. The flange portion 452 and the second pin portion 453 are movably contained in the containing portion 412.

The second pin portion 453 of the push pin 45 is inserted into the inner hole of the coil spring 46, and the coil spring 46 is interposed between the flange portion 452 and the bottom surface of the containing portion 412 in a compressed state. That is, the push pin 45 is biased toward the outer side of the containing hole 411 (the insert-70 side; the −X side in the drawing) by the coil spring 46. Instead of the coil spring 46, an elastic member such as rubber may be used.

In one or more embodiments, as shown in FIG. 11, the push pin 45 is arranged in an area that does not include the center of gravity $GP_1$ of the base 41 and that is lower than the center of gravity $GP_1$. Therefore, in a state in which the pressing device 20 presses the DUT 100 against the socket 5 (that is, in a state in which the test tray 50 is in a vertical state), the push pin 45 contacts an area AR (refer to FIG. 8 described above) of the insert main body 71 that does not include the center of gravity $GP_2$ of the insert main body 71 and is lower than the center of gravity $GP_2$.

Here, as shown in FIG. 11, the center of gravity $GP_1$ of the base 41 in one or more embodiments means the center of gravity on the surface of the base 41 when the base 41 is viewed from the front (when the base 41 is viewed along the +X direction in the drawing). Similarly, as shown FIG. 8 described above, the center of gravity $GP_2$ of the insert main body 71 in one or more embodiments means the center of gravity on the surface of the insert main body 71 when the insert main body 71 is viewed from the front (when the insert main body 71 is viewed along the −X direction in the drawing).

The area AR may overlap with the center of gravity $GP_2$ of the insert main body 71 in the vertical direction. Further, the center of the area AR may overlap with the center of gravity $GP_2$ of the insert main body 71 in the vertical direction.

The area AR is located between the four (4) insert openings 711 in the insert main body 71. The area AR may be located between the two (2) lower insert openings 711 shown in FIG. 8.

The push pin 45 may be arranged in an area of the base 41 including the center of gravity $GP_1$. In this case, the push pin 45 contacts an area of the insert main body 71 including the center of gravity $GP_2$.

The first pin portion 451 of the push pin 45 has an oval cross-sectional shape. Here, the oval means a shape including a pair of straight portions 451a extending in parallel to each other and a pair of arc portions 451b connecting the straight portions to each other. The push pin 45 is held by the base 41 so that the cross-sectional longitudinal direction $VL_2$ of the first pin portion 451 of the push pin 45 is substantially perpendicular to the vertical direction (the Z-axis direction in the drawing).

As long as the push pin 45 is held by the base 41 so that the longitudinal direction $VL_2$ of the first pin portion 451 in the cross-sectional direction is non-parallel to the vertical direction (the Z-axis direction in the drawing), the posture of the cross-sectional shape of the push pin 45 with respect to the vertical direction is not particularly limited to the above.

Since the push pin 45 has a non-circular planar shape and the longitudinal direction $VL_2$ of the cross section of the first pin portion 451 is non-parallel to the vertical direction (the Z-axis direction in the drawing), it is possible to prevent the insert main body 71 from rotating about the push pin 45 when the push pin 45 abuts against the insert main body 71.

Further, since the push pin 45 has an oval cross-sectional shape, it is possible to manufacture the non-circular first pin portion 451 only by partially cutting the cylindrical member, and it is also possible to suppress an increase in cost of the match plate 30.

The length $L_1$ of the portion of the push pin 45 protruding from the base 41 is set so that the push pin 45 contacts the insert main body 71 before the pusher 42 contacts the DUT 100 held on the device core 72 of the test tray 50. There fore, before pressing the DUT 100 against the socket 5, it is possible to correct the posture of the insert 70 to a vertical position, and it is possible to center the insert 70 with respect to the opening 63 of the frame member 60.

Also, the length $L_1$ of the projecting portion of the push pin 45 is set so that the push pin 45 contacts the insert main body 71 before the guide pin 43 of the pressing unit 40 is fitted into the guide hole 712 of the insert 70. There fore, before positioning the insert 70 with respect to the pressing unit 40, it is possible to correct the posture of the insert 70 to a vertical position, and it is possible to center the insert 70 with respect to the opening 63 of the frame member 60.

Hereinafter, the pressing operation of the DUT 100 by the pressing device 20 described above will be described referring to FIG. 13A to FIG. 13B. FIG. 13A to FIG. 13E is a cross-sectional view showing the DUT pressing operation in one or more embodiments.

Figure 13A:
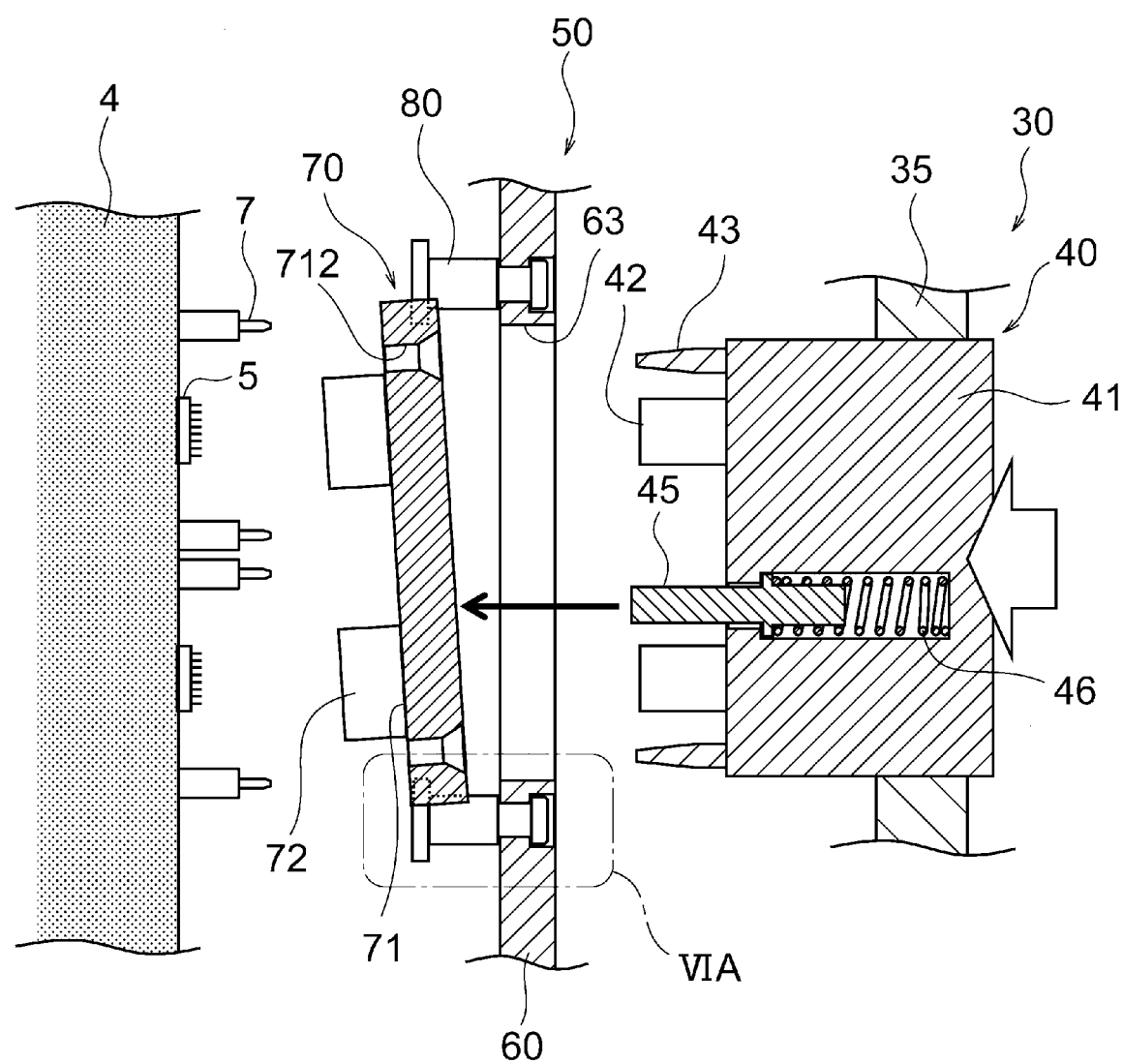
FIG. 13A is a cross-sectional view (part 1) showing a DUT pressing operation in one or more embodiments.

When the test tray 50 containing the untested DUT 100 is carried into between the sockets 5 and the pressing device 20 by the above-described transport device (not shown), the plurality of inserts 70 included in the test tray 50 respectively face the plurality of pressing units 40 included in the pressing device 20 as shown in FIG. 13A. At this time, in one or more embodiments, the test tray 50 is carried in a vertical state by the above-described transport device.

Here, as described above, each of the inserts 70 is movably held by a fastener 80. Therefore, in a state in which the test tray 50 is in a vertical state, as shown in the same figure, the insert 70 may be inclined with respect to the frame due to its own weight. FIG. 6A described above is an enlarged view corresponding to the VIA portion of FIG. 13A.

Figure 13B:
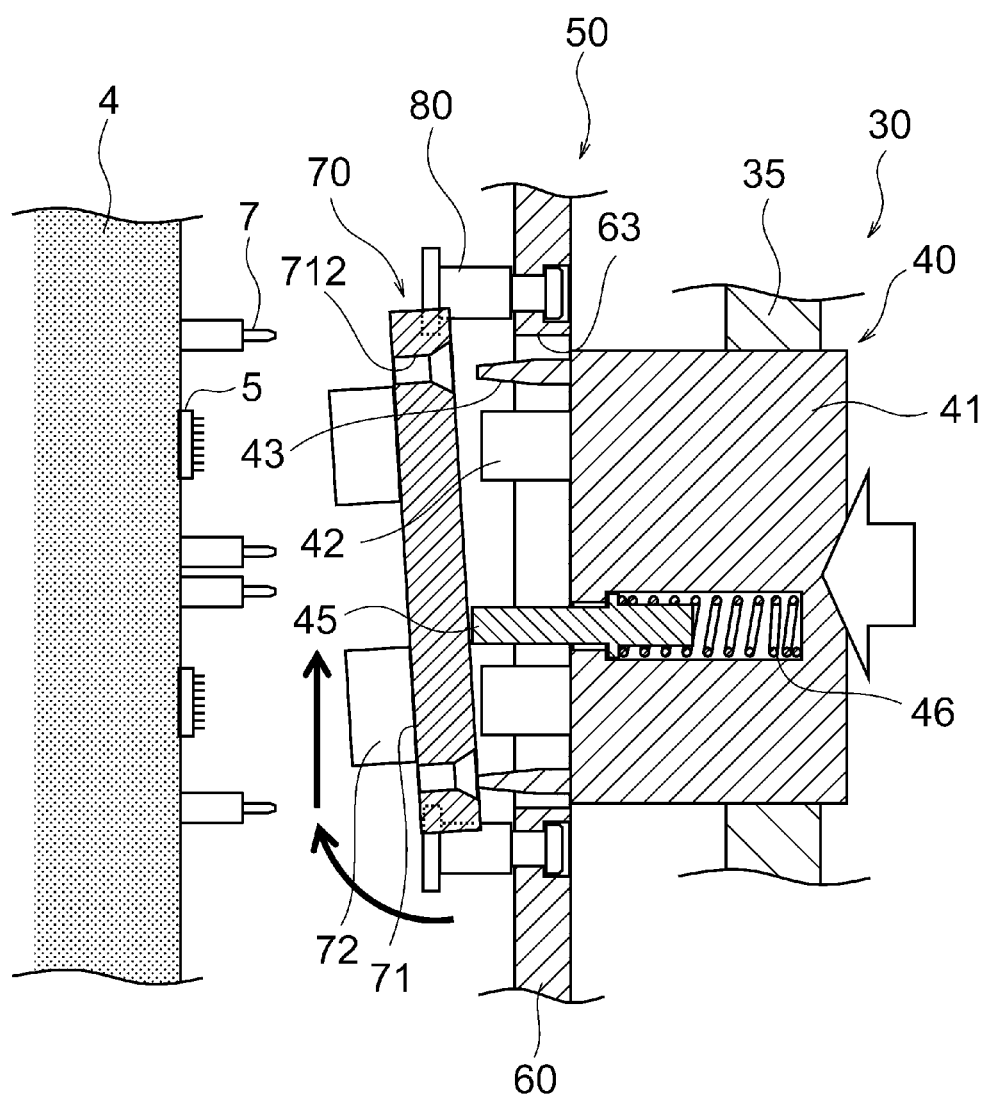
FIG. 13B is a cross-sectional view (part 2) showing the DUT pressing operation in one or more embodiments.

Next, when the actuator 25 of the pressing device 20 is driven and the entire match plate 30 moves forward toward the test tray 50, as shown in FIG. 13B, first, the push pin 45 of each of the pressing units 40 contacts the insert main body 71, and the compressing of the coil spring 46 starts. As a result, the insert 70 is pressed by the push pin 45, and the inclined posture of the insert 70 is corrected to a vertical state. At this time, in one or more embodiments, since the push pin 45 contacts the area AR (refer to FIG. 8 described above) which is an area that does not include the center of gravity $GP_2$ of the insert main body 71 and that is lower than the center of gravity $GP_2$, it is possible to increase the certainty of correcting the posture of the insert 70.

Further, the flange portion 83 of the fastener 80 is guided along the enlarged portion 718 of the cutout 716 by the pressing of the insert 70 by the push pin 45 and contacts the bottom surface 719 of the enlarged portion 718, there fore the insert 70 is centered with respect to the opening 63 of the frame member 60. That is, the center of the insert main body 71 is positioned with respect to the center of the opening 63 of the frame member 60.

That is, in one or more embodiments, it is possible to correct the posture of the insert 70 and center the insert 70 by pressing the insert 70 by the push pin 45. FIG. 6B described above is an enlarged view corresponding to a VIB portion of a later-described FIG. 13C showing the status after the posture correction and centering of insert 70.

Further, although not shown in the drawings, the guide pin 352 of the plate member 35 of the match plate 30 is fitted into the guide hole 65 of the frame member 60 of the test tray 50 in accordance with the above-described forward movement of the match plate 30 by the actuator 25. As a result, the test tray 50 is positioned with respect to the match plate 30 in the horizontal direction (the Y-axis direction in the drawing).

Here, in one or more embodiments, the match plate 30 and the plurality of sockets 5 on the test head 4 are structurally positioned with respect to each other in advance. Therefore, when the test tray 50 is positioned with respect to the match plate 30 with the guide pin 352 and the guide hole 65, the test tray 50 is positioned with respect to the socket 5.

As described above, the guide pin 352 is arranged at a center in the longitudinal direction of the match plate 30, and the guide hole 65 is arranged at a center in the longitudinal direction of the test tray 50. Therefore, it is possible to reduce the influence (thermal expansion and thermal contraction) caused by the thermal stress applied to the test tray 50 by the handler 10.

Concerning the positioning of the test tray 50 with respect to the socket 5 in the vertical direction (the Z-axis direction in the drawing), although it is not particularly illustrated, for example, the positioning pin included in the actuator of the above-described transport device is fitted into a positioning hole formed in a side surface of the short side (a side surface along the Z-axis direction in the drawing) of the frame member 60 of the test tray 50, therefore it is possible to position the test tray 50.

Next, when the actuator 25 of the pressing device 20 further advances the entire match plate 30 toward the test tray 50, the push pin 45 is pressed by the insert main body 71 and the coil spring 46 is further compressed as shown in FIG. 13C. At the same time, the guide pin 43 of the pressing unit 40 is inserted into the guide hole 712 of the insert 70, and the pusher 42 of the pressing unit 40 enters the insertion opening 711 of the insert main body 71 through the opening 63 of the test tray 50 frame member 60.

Figure 13D:
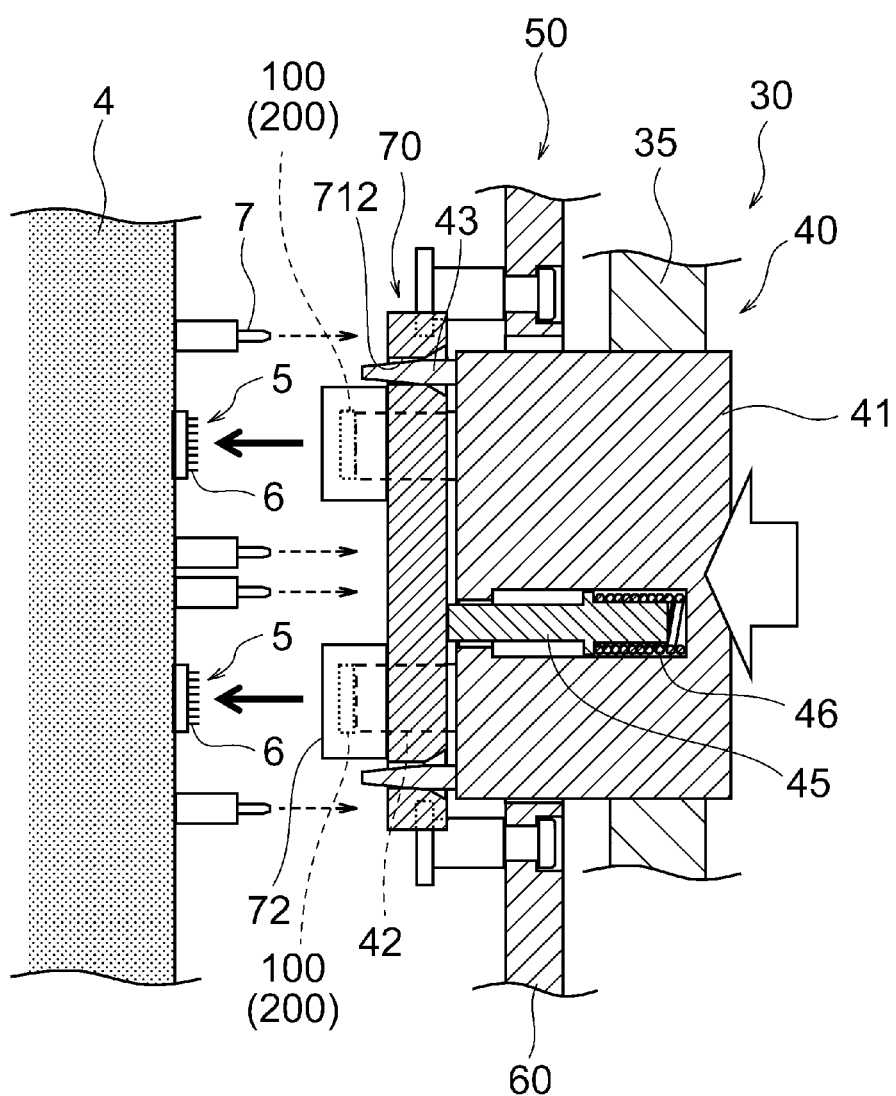
FIG. 13D is a cross-sectional view (part 4) showing the DUT pressing operation in one or more embodiments.

Then, as shown in FIG. 13D, the insert 70 is positioned with respect to the pressing unit 40 by fitting the guide pin 43 of the pressing unit 40 into the guide hole 712 of the insert 70. After the guide pin 43 is fitted into the guide hole 712, the pusher 42 contacts the DUT 100 held by the device core 72.

The timing at which the pusher 42 contacts the DUT 100 is not particularly limited. For example, the pusher 42 may contact the DUT 100 after the guide pin 7 of the socket 5 is fitted into the guide hole (not shown) of the device core 72. Alternatively, the pusher 42 may contact the DUT 100 after the contactors 6 of the socket 5 contact the terminals of the DUT 100.

Figure 13E:
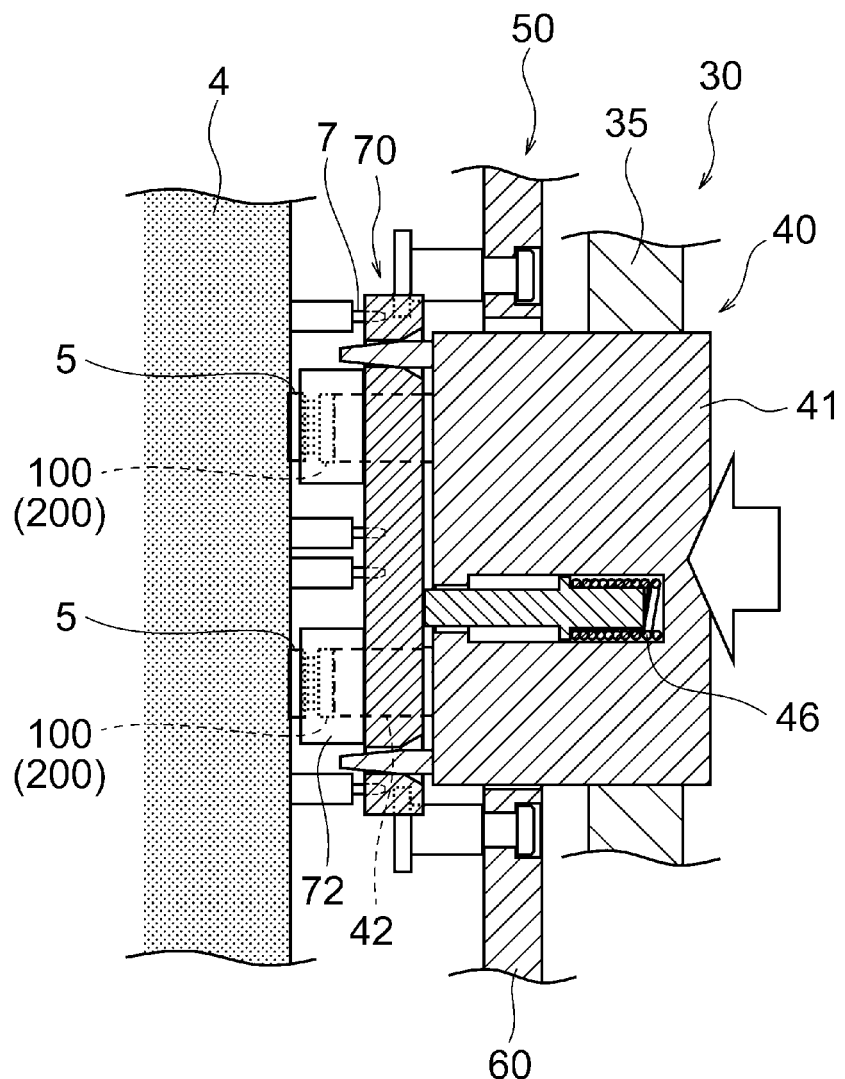
FIG. 13E is a cross-sectional view (part 5) showing the DUT pressing operation in one or more embodiments.

Then, when the actuator 25 of the pushing device 20 further advances the entire match plate 30 toward the test tray 50, the pusher 42 pushes the DUT 100 held by the device core 72 against the socket 5 as shown in FIG. 13E. At this time, the device core 72 is positioned with respect to the socket 5 by fitting the guide pins 7 provided around the socket 5 into the guide holes (not shown) of the device core 72.

Then, when the pusher 42 presses the DUT 100 held by the device core 72 against the socket 5, the contactors 6 of the socket 5 contact the terminals of the DUT 100, and the DUT 100 is electrically connected to the test head 4 via the socket 5. In this state, the mainframe 3 transmits a test signal to the DUT 100 via the test head 4 to test the DUT 100.

As described above, in one or more embodiments, since the pressing device 20 includes the abutting part 44 that abuts against the insert 70, it is possible to correct the posture of the insert 70 that is inclined with respect to the frame member 60 of the test tray 50 to the vertical state. As a result, since it is possible to accurately position the DUT with respect to the socket, it is possible to suppress contact failure and damage between the DUT 100 and the socket 5, and to extend the life of the socket 5.

In particular, in one or more embodiments, since the posture of the insert 70 that is inclined with respect to the frame member 60 of the test tray 50 is corrected to the vertical state, even when the DUT 100 is pressed against the socket 5 in a state where the test tray 50 is in a vertical state, it is possible to reduce the resistive force at the time of fitting the guide hole 712 of the insert 70 and the guide pin 43 of the pressing unit 40, and it is possible to reduce the wear occurring in the insert main body 71 and the guide pin 43.

Further, in one or more embodiments, it is possible to hold the insert 70 by the fastener 80 in a state in which the insert 70 is centered with respect to the opening 63 of the frame member 60 by the abutment of the abutment part 44 against the insert 70 and the guidance of the fastener 80 by the cutout 716 described above. Therefore, even when the DUT 100 is pressed against the socket 5 in a state in which the test tray 50 is in a vertical state, it is possible to reduce uneven wear of the insert main body 71 and the guide pin 43 caused by the own weight of the insert 70.

It should be noted that the embodiments described above are described to facilitate understanding of the present disclosure and are not described to limit the present disclosure. It is therefore intended that the elements disclosed in the above embodiments include all design modifications and equivalents to fall within the technical scope of the present disclosure.

For example, a device carrier 200 (refer to FIG. 4, FIG. 13D and FIG. 13E) may be used to test the DUT 100. In this case, the test tray 50 containing the device carrier 200 containing the DUT 100 is transported by the handler 10, and the device carrier 200 is pressed against the socket 5, therefore the DUT 100 and the socket 5 are electrically connected via the device carrier 200. As such a device carrier 200, a carrier described in JP 2019-197012 A1 or JP 2013-79860 A1 can be used.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCES SIGNS LIST

1 . . . Electronic component test apparatus
4 . . . Test head
5 . . . Socket
10 . . . Handler
20 . . . Pressing device
25 . . . Actuator
30 . . . Match plate
352 . . . Guide pin
40 . . . Pressing unit
41 . . . Base
42 . . . Pusher 43 . . . Guide pin
44 . . . Abutting part
45 . . . Push pin
46 . . . Coil spring
50 . . . Test tray
60 . . . Frame member
65 . . . Guide hole
70 . . . Insert
71 . . . Insert main body
711 . . . Insertion opening
712 . . . Guide hole
716 . . . Cutout
717 . . . Insertion portion
718 . . . Enlarged portion
AR . . . Area lower than center of gravity
72 . . . Device core
80 . . . Fastener
81 . . . Shaft portion
83 . . . Flange portion
100 . . . DUT

What is claimed is:

1. An electronic component handling apparatus comprising:
    a pressing device that presses a device under test (DUT) or a carrier containing the DUT against a socket while a test tray having inserts is in a vertical state, wherein
    the pressing device comprises a match plate comprising pressing units disposed to correspond to the inserts,
    each of the inserts comprises:
        an insert main body including a resin material and having insertion openings into which the DUT or the carrier is inserted; and
        device holding parts, each of which holds the DUT or the carrier, that are attached to the insert main body to correspond to the insertion openings,
    each of the pressing units comprises:
        pushers that each contact the DUT or the carrier; and
        a single abutting part that abuts the insert main body of a corresponding one of the inserts, and
    the single abutting part of each of the pressing units contacts an area of the insert main body of the corresponding one of the inserts between the insertion openings of the corresponding one of the inserts.

2. The electronic component handling apparatus according to claim 1, wherein, in each of the pressing units, the single abutting part abuts the insert main body of the corresponding one of the inserts before the pushers contact the DUTs or the carriers.

3. The electronic component handling apparatus according to claim 1, wherein the single abutting part of each of the pressing units comprises:
    a push pin that contacts the insert main body of the corresponding one of the inserts; and
    a spring that biases the push pin toward the insert main body of the corresponding one of the inserts.

4. The electronic component handling apparatus according to claim 3, wherein the push pin of each of the pressing units contacts a center of gravity of the insert main body of the corresponding one of the inserts or an area of the insert main body of the corresponding one of the inserts lower than the center of gravity in the vertical state.

5. The electronic component handling apparatus according to claim 3, wherein the push pin of each of the pressing units:
    has an oval cross-sectional shape, and
    is disposed such that a longitudinal direction of a cross section of the push pin is not parallel to a vertical direction.

6. The electronic component handling apparatus according to claim 3, wherein
    each of the pressing units further comprises a base holding the push pin, and
    in each of the pressing units, a protruding portion of the push pin protruding from the base has a length such that the push pin contacts the insert main body of the corresponding one of the inserts before the pushers contact the DUTs or the carriers.

7. The electronic component handling apparatus according to claim 3, wherein
    each of the pressing units further comprises a first guide pin that fits into a first guide hole of the insert main body of the corresponding one of the inserts, and
    in each of the pressing units, the push pin is independent of the first guide pin.

8. The electronic component handling apparatus according to claim 7, wherein
    each of the pressing units further comprises a base holding the push pin, and
    in each of the pressing units, a protruding portion of the push pin protruding from the base has a length such that the push pin contacts the insert main body of the corresponding one of the inserts before the first guide pin fits into the first guide hole.

9. The electronic component handling apparatus according to claim 1, wherein
    the match plate further comprises a second guide pin that fits into a second guide hole of the test tray.

10. The electronic component handling apparatus according to claim 9, wherein
    the test tray comprises a frame having the second guide hole having an oval planar shape and a fastener fixed to the frame and that movably holds the inserts, and
    the second guide hole is disposed such that a longitudinal direction of a cross section of the second guide hole is substantially parallel to a vertical direction in a state in which the pushers face the DUTs or the carriers held on the test tray.

11. The electronic component handling apparatus according to claim 1, wherein the test tray comprises a frame, a fastener fixed to the frame and that movably holds the inserts, and a centering mechanism that centers the inserts when the single abutting part of each of the pressing units abuts the insert main body of the corresponding one of the inserts.

12. The electronic component handling apparatus according to claim 1, wherein
    the test tray comprises a frame and a fastener fixed to the frame and that movably holds the inserts by inserting the fastener into a cutout of the inserts,
    the fastener comprises a shaft portion and a flange portion larger than the shaft portion,
    the cutout comprises an insertion portion in which the shaft portion is inserted and an enlarged portion that is larger than the insertion portion and contains the flange portion,
    the enlarged portion has a bottom surface at which the insertion portion is open and that the flange portion contacts, and
    the enlarged portion has a shape that tapers toward the bottom surface.

13. An electronic component test apparatus comprising:
the electronic component handling apparatus according to claim 1; and
a tester having a socket.

* * * * *